(12) United States Patent
    Chen

(10) Patent No.: US 8,632,925 B2
(45) Date of Patent: Jan. 21, 2014

(54) APPARATUS AND METHODS FOR MAKING HIGH PERFORMANCE FUEL CELL

(71) Applicant: Ellen Tuanying Chen, Germantown, MD (US)

(72) Inventor: Ellen Tuanying Chen, Germantown, MD (US)

(73) Assignee: Ellen T Chen, Germantown, MD (US)

( * ) Notice: Subject to any disclaimer, the term of this patent is extended or adjusted under 35 U.S.C. 154(b) by 0 days.

(21) Appl. No.: 13/659,974

(22) Filed: Oct. 25, 2012

(65) Prior Publication Data

US 2013/0266888 A1    Oct. 10, 2013

Related U.S. Application Data

(63) Continuation of application No. PCT/US2011/034347, filed on Apr. 28, 2011.

(51) Int. Cl.
    *H01M 8/10*    (2006.01)

(52) U.S. Cl.
    USPC ............ 429/491; 429/482; 429/492; 429/506

(58) Field of Classification Search
    USPC ................... 429/482, 491, 492, 506
    See application file for complete search history.

(56) References Cited

U.S. PATENT DOCUMENTS

| | | | |
|---|---|---|---|
| 2006/0154126 A1* | 7/2006 | Ritts et al. ...................... | 429/29 |
| 2008/0237063 A1* | 10/2008 | Chen ......................... | 205/777.5 |
| 2009/0274936 A1* | 11/2009 | Goldstein et al. ............... | 429/13 |

* cited by examiner

*Primary Examiner* — Gregg Cantelmo

(57) ABSTRACT

An electrolyte-free, oxygen-free, high power, and energy dense single fuel cell device is provided, along with methods for making and use. The fuel cell device is based on an electron-relay function using a nanostructured membrane prepared by cross-linking polymers, and having embedded within the membrane, a reactant. Use of the fuel cell device does not produce water, or CO2, and no oxygen is needed. The rechargeability of the fuel cell device revealed it can function as a portable battery.

11 Claims, 27 Drawing Sheets

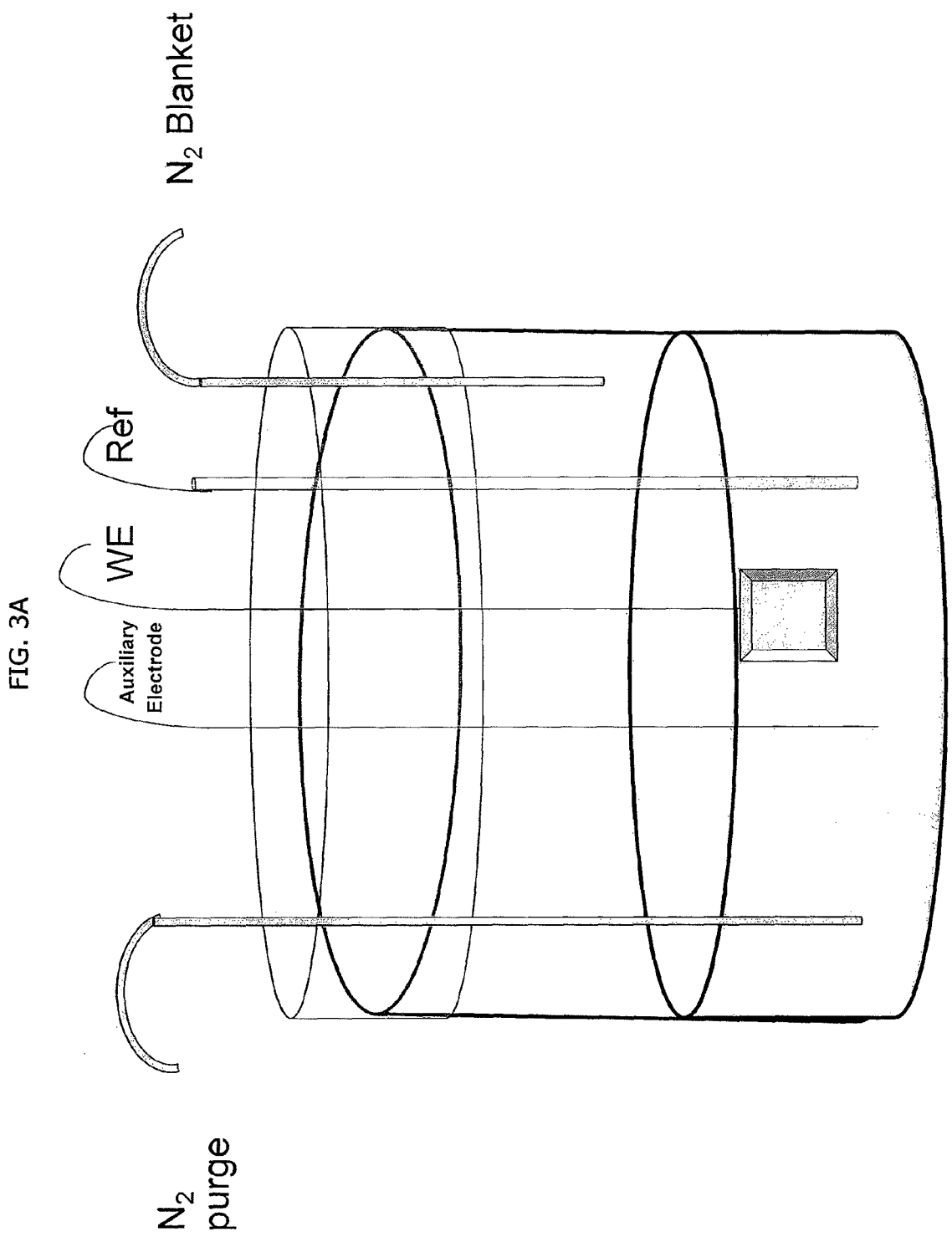

APPARATUS AND METHODS FOR MAKING HIGH PERFORMANCE FUEL CELL

CROSS-REFERENCE TO RELATED APPLICATIONS

The present application is a continuation of PCT/US2011/034347, filed on 28 Apr. 2011, which claims priority to U.S. Provisional Application No. 61/328,916, filed 28 Apr. 2010. The contents of each of the aforementioned applications is hereby incorporated by reference in its entirety.

BACKGROUND OF THE INVENTION

The present invention relates to the field of power and energy, and energy conversion, in particular, to direct methanol fuel cells (DMFC) and batteries comprising a nanostructure biomimetic electron-relay membrane electrode assembly (MEA).

Due to the danger and high cost for storage of liquid hydrogen as fuel cell, more and more people are interested in developing fuel cells that are less dangerous and less costly due to their storage of hydrogen. Proton Exchange Membrane Fuel Cells (PEMFCs) have been a candidate for powering the next generation of vehicles with their efficiency, low-noise power, and ability to operates at 70-100° C. The Polymer Electrolyte Membrane (PEM) fuel cell has a fluorinated polymeric membrane, which allows hydrogen ions (protons) to pass through it. The membrane is coated on both sides with highly dispersed metal alloy particles (mostly platinum) that are active catalysts. The PEM cell appears to be more adaptable to automobile use.

The cost of fuel cells hinders competition in widespread domestic and international markets which do not have significant government subsidies. According to the Business Communications Company, the market for fuel cells was about $218 million in 2000 and will reach $7 billion by 2009 (21$^{th}$ Renewable Energy data Book, 2005, U.S. Government). PEMFCs currently cost several thousand dollars per kW.

The conventional approaches in fuel cell developments use fuels (either hydrogen or alcohol) as reactants taken in an oxidation reaction at the anode, and a reduction reaction of oxygen at the cathode, using a platinum catalyst. Various electrolytes have to be used in order to carry the charged ions to the surface of the electrodes, thereby causing the fuel cell to function. The overwhelming effect of over-potentials caused by: (1) proton migration; (2) the two-phase, (liquid (fuel)-gas (oxygen, $CO_2$)) mass diffusion; and (3) the flow of fuel to the surface of the MEA (i.e., convection fuel flow over-potential) in the fuel cell have been previously reported (See, A. J. Bard and L. R. Faulkner, *Electrochemical Methods, Fundamentals and Applications*, John Wiley & Sons, New York, (1980); P. T. Kissinger and W. R. Heineman, *Laboratory Techniques in Electroanalytical Chemistry*, Second Edition, Marcel Dekker, New York, (1996); W. P. Liu, C. Y. Wang, *J. Power Sources*, 164:189 (2007); T. Bewer, et al., *J. Power Sources*, 125:1, (2004); Chao Xu, Ph.D. Dissertation: "Transport phenomena of methanol and water in liquid feed direct methanol fuel cells", *The Hong Kong University of Science and Technology*, (2008).

The Direct-Methanol Fuel Cell (DMFC) is similar to the PEM cell, in that it uses a polymer membrane as an electrolyte. However, a catalyst on the DMFC anode draws hydrogen from liquid methanol, eliminating the need for a fuel reformer. The major scientific challenges facing current PEMFC and conventional DMFC technology are: (1) low efficiency; (2) the conventional DMFC cell suffers from being irreversibly hydrodynamic due to the by-products of $CO_2$ and water; (3) energy loss due to the hydrophobic polymer electrolyte membrane being the only means to promote the DMFC function, which limits this technology because water floods the membrane electrode assembly (MEA); (4) the $CO_2$ produced as a by-product also causes malfunction of the membrane; (5) methanol crossing over the membrane; and (6) the danger of a dry Nafion® membrane, which becomes extremely explosive and toxic, hence requiring a humidifier to moisture the MEA in order to avoid the dangerous dryness.

Because of the drawbacks of current technologies driving fuel cell development, the goal of the present invention is to develop a revolutionary approach that overcomes the drawbacks associated with the current technology and create new fuel cells and batteries offering a magnitude increase in fuel cell performance with possible outcome of reducing cell cost.

BRIEF SUMMARY OF THE INVENTION

The present invention provides an electrolyte-free and oxygen-free, high power, and high energy density, dual functioning (battery/fuel cell) device, based on an electron-relay (E-R) functioning, nano-biomimetic membrane electrode assembly (NBMEA), which comprises a nanostructure, and which also comprises, through cross-linking multiple receptors polymers, an embedded "reactant" membrane, using a self-assembling technology.

In an embodiment, the present invention provides a fuel cell device wherein the power density of the device of the present invention can achieve at least 2.4 kW/kg.

In an embodiment, the present invention provides a fuel cell device, wherein the energy density can achieve at least 24.3 kWh/kg with an energy efficiency of about 95% at room temperature.

In a further embodiment, the present invention provides a fuel cell device wherein the discharge (DC) voltage at a −50 mA rate can be at least 12 hours without interruption.

In another embodiment, the present invention provides a fuel cell device wherein the open circuit potential of the device can achieve a magnitude of at least about 10V under room temperature without using an electrolyte.

In an embodiment, the present invention provides a fuel cell device, wherein no extra water or $CO_2$ was formed during operation of the device, and no oxygen is needed. The current density of the device can achieve at least 0.1 A/cm$^2$.

The recharge ability of the glassy carbon (GC)/self-assembling membrane (SAM)-DMFC of the present invention, revealed that it could act as a portable battery.

In an embodiment, the present invention provides a fuel cell device comprising (a) an electrode comprising a substrate of gold or glassy carbon; (b) a self-assembling membrane comprising a polymer matrix, wherein the polymer matrix is comprised of an electrically conductive copolymer, wherein the copolymer is further comprised of one or more first O-cyclodextrin molecules having at least one or more free acetyl groups, one or more polyethylene glycol molecules, one or more poly(4-vinylpyridine) molecules, and one or more second β-cyclodextrin molecules, (c) the self-assembling membrane having a nanobiomimetic surface structure comprising one or more nanopillars and one or more nanopores, (d) an insulator, and (e) at least two current collectors.

In another embodiment, the present invention provides a fuel cell device as described above, wherein the polymer matrix has embedded within it a hydrophobic, aromatic acetate.

BRIEF DESCRIPTION OF THE SEVERAL VIEWS OF THE DRAWING(S)

FIG. 1 is a schematic drawing depicting the biomimetic electron-relay membrane using the structure of the Fibroblast Growth Factor (FGF) receptor 1-inhibitor complex.

FIG. 2A is a prior art photograph depicting the characterization of the surface morphology of the inventor's previous membranes using the Atomic Force Microscope (AFM). The AFM characterization of the membranes. The islands on the membrane were on a gold (50 nm in thickness of the gold) electrode.

FIG. 2B is a photograph depicting the characterization of the surface morphology of nanopillars and nanopores were on a glassy carbon (GC) electrode (2 mm in thickness of the electrode). The nanopillars and nanoporous can be seen in the photo. The nanopillars are in the range of about 10-40 nm in diameter with an average length (z direction) of about 2-4 nm. The pores are in the range of about 50-60 nm in diameter.

FIG. 3A is an illustration of an embodiment of the present invention, depicting the construction of a fuel cell device of the present invention for testing in the laboratory at room temperature.

Figure 4:
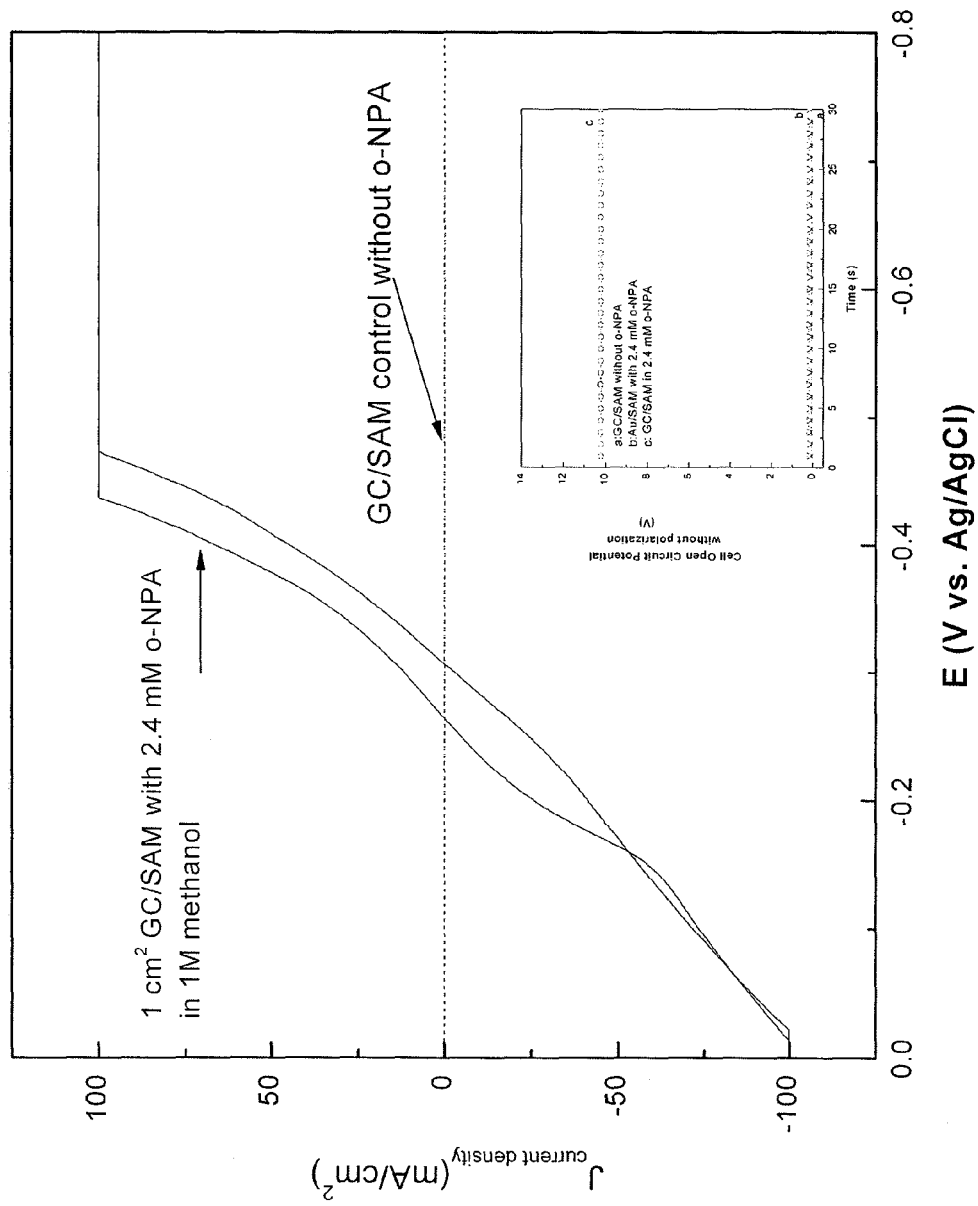

FIG. 4 is a graph comparing the direct impact of the electron-relay system of the GC/SAM on the CV current change in the presence of 2.4 mM o-nitrophenyl acteate (o-NPA) during scan the voltage (20 my/s) from 0 to −800 mV. The inset graph illustrates the GC/SAM-DMFC cell of the present invention has an open circuit potential over 10-fold greater than the control cell, without adding o-NPA, and it also has an open circuit potential higher than the AU/SAM electrode under a no polarization condition. The spontaneous E-R interaction with o-NPA created a voltage discharge which was significantly higher than that of the conventional DMFC cell (1V).

Figure 5A:
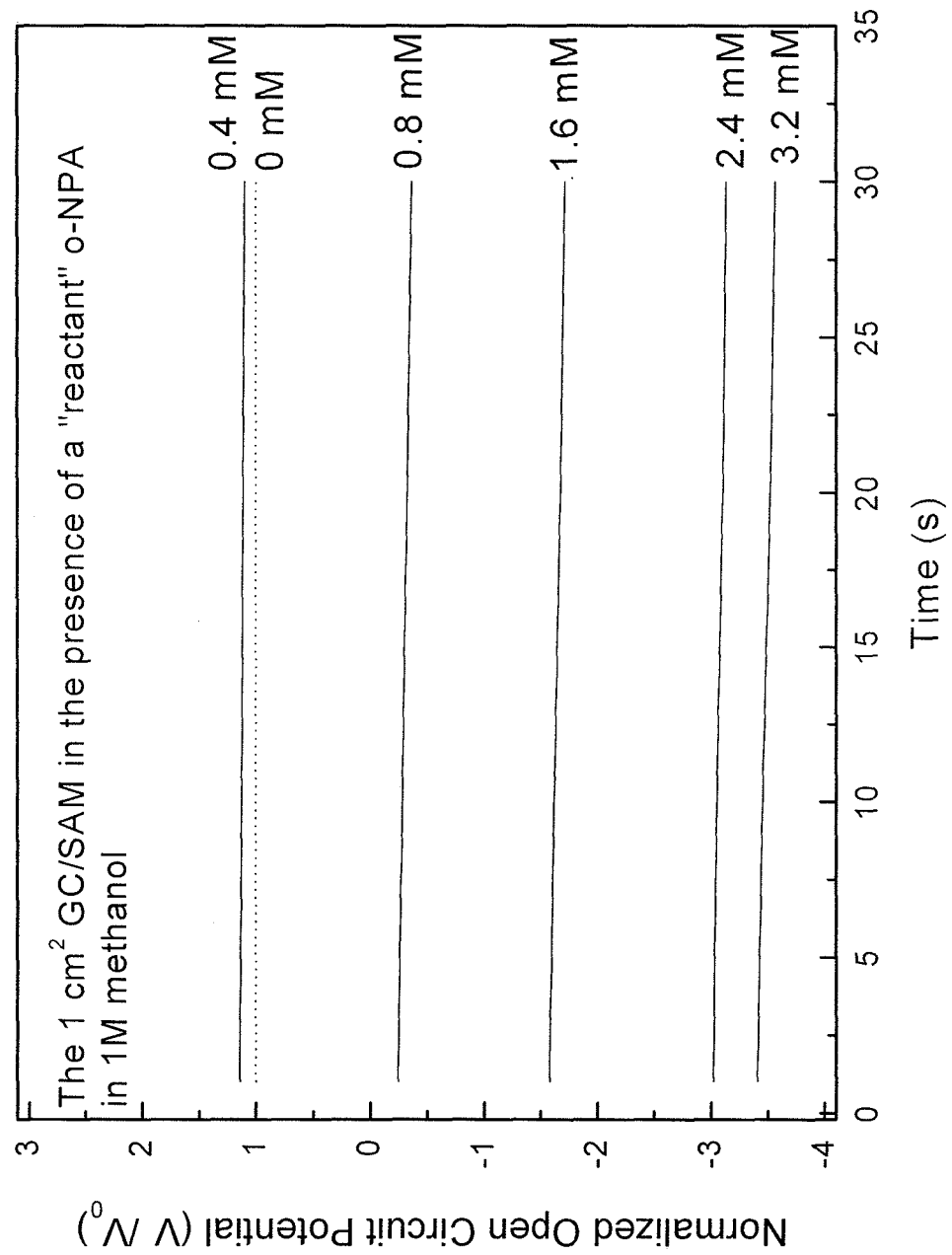

FIG. 5A illustrates the effect of "reactant" o-NPA concentration on the normalized open circuit potential of the GC/SAM device of the present invention at room temperature.

Figure 5B:
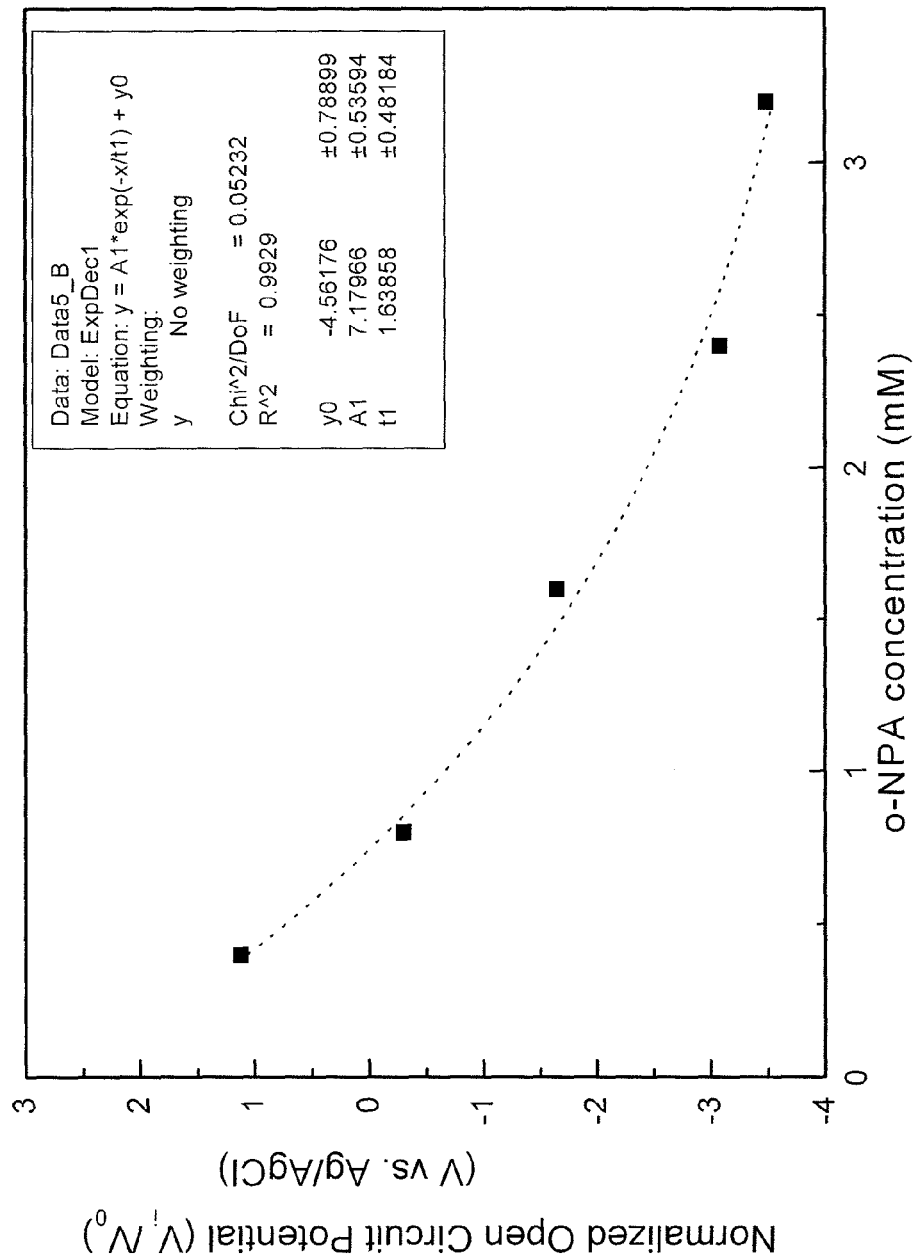

FIG. 5B is a graph depicting the exponential decay relationship between the normalized open circuit potential and the o-NPA concentrations by a nonlinear curve fitting method.

Figure 6A:
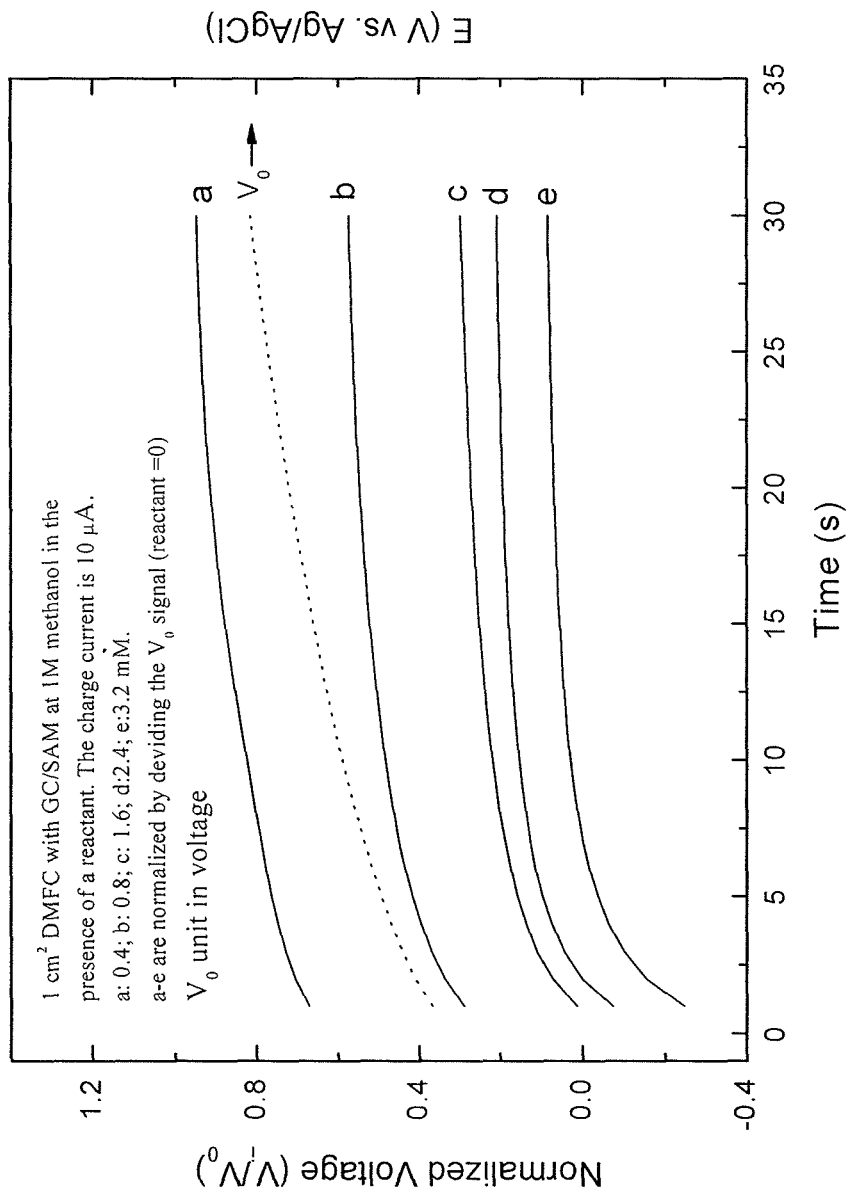

FIG. 6A is a graph depicting the effect of the "reactant" o-NPA concentrations on the normalized charging voltage of the GC/SAM of the present invention at room temperature.

Figure 6B:
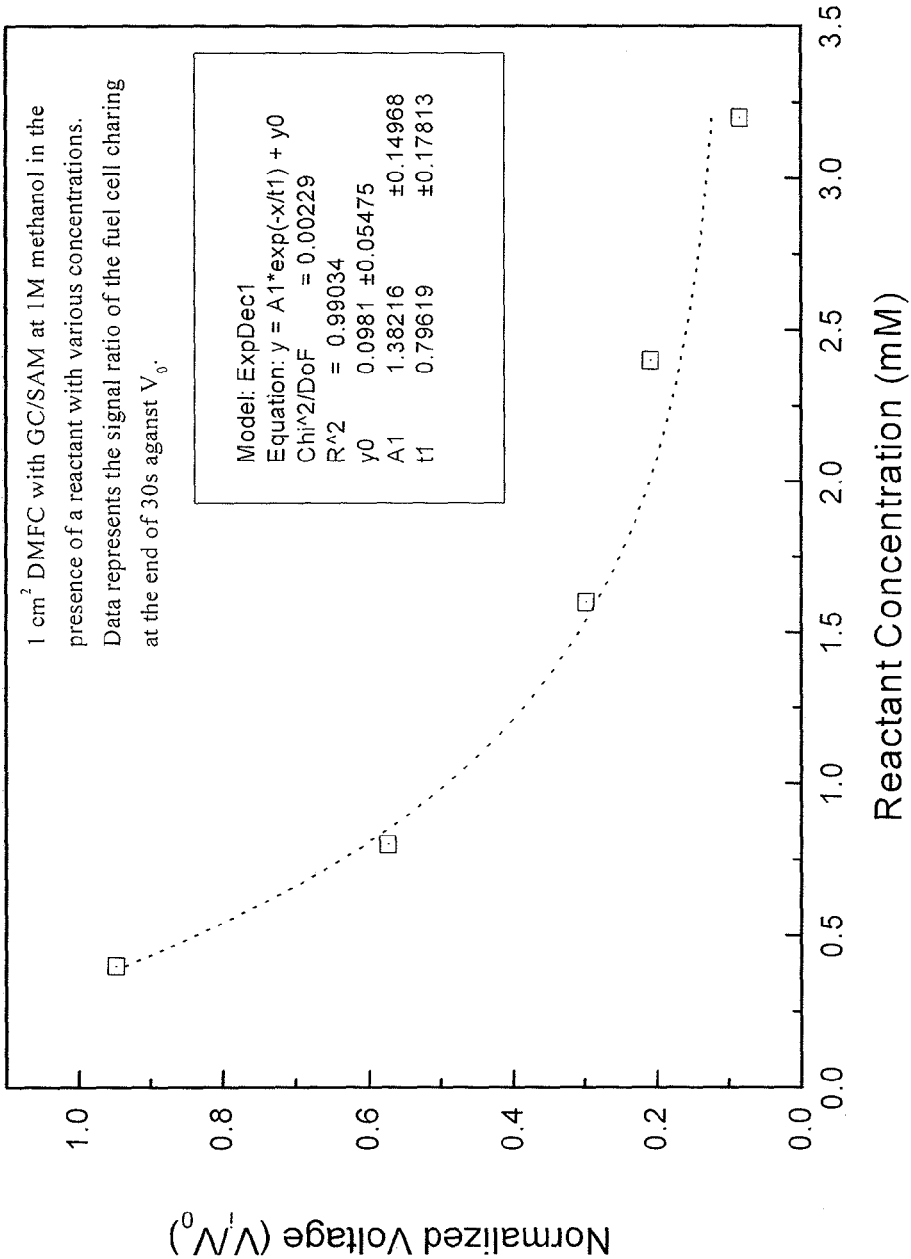

FIG. 6B is a graph depicting the exponential decay relationship between the normalized charging voltage and the o-NPA concentrations by a nonlinear curve fitting method.

Figure 7A:
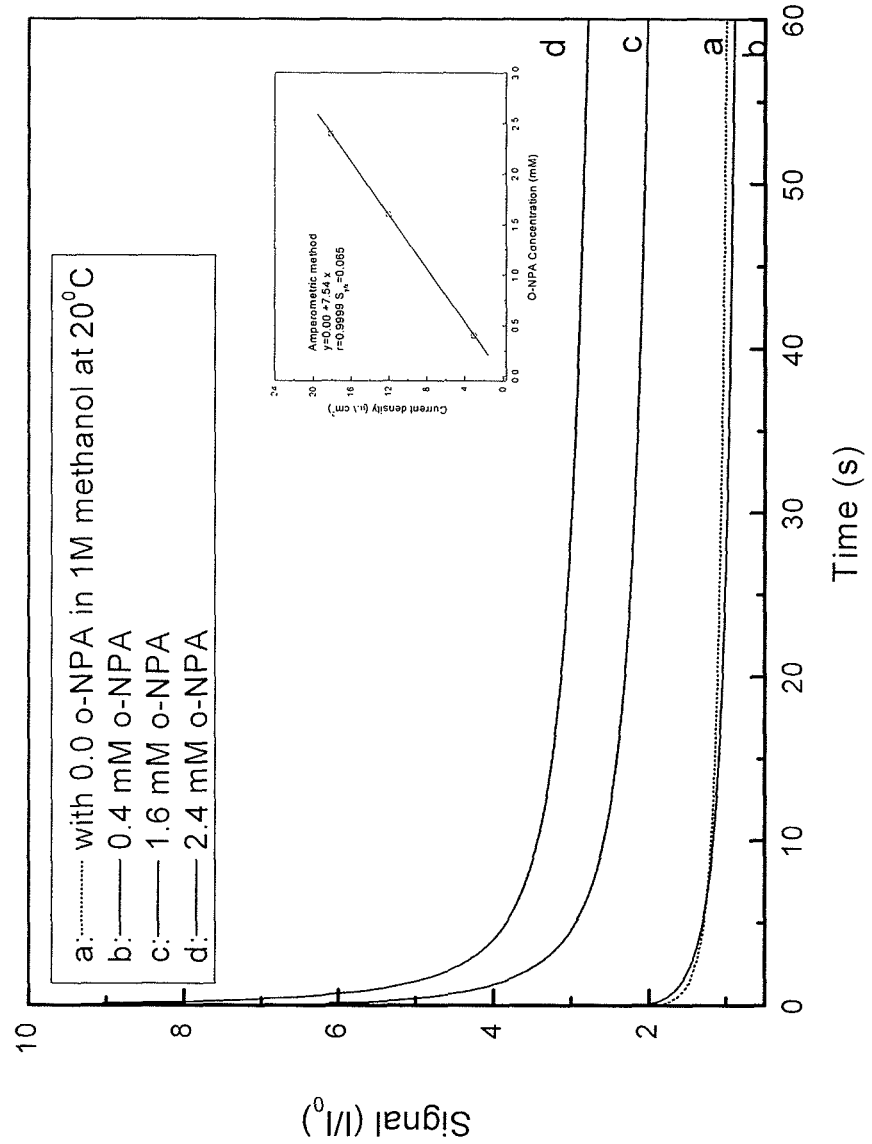

FIG. 7A is a graph depicting the dual functions of the single NBMEA-DMFC fuel cell of the present invention acting as a sensor for o-NPA in 1M methanol, at room temperature. The chronoamperometric curves for GC/SAM DMFC cell illustrate their functioning, either with, or without the presence of o-NPA, when using a GC/SAM device of the present invention. The methods for making the NBMEA are described below.

Figure 7B:
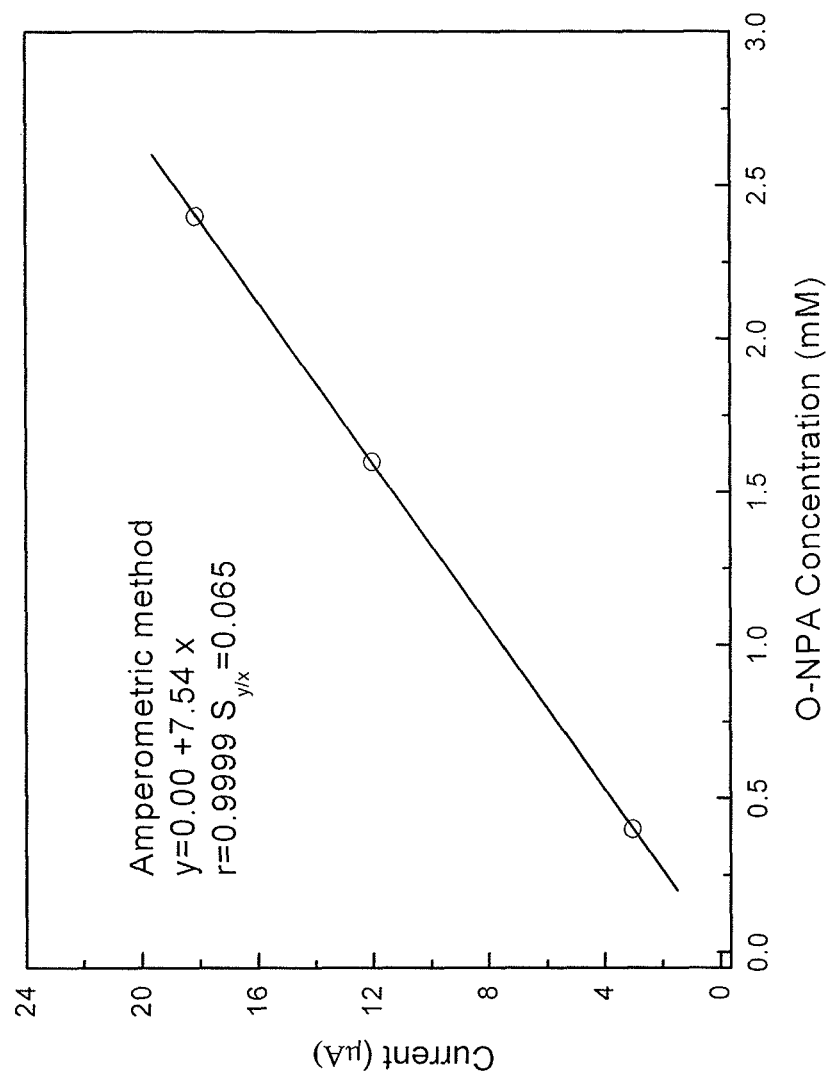

FIG. 7B is a graph showing the linear least-square regression of the amperometric current vs. o-NPA concentration of the single NBMEA-DMFC fuel cell of the present invention.

Figure 8:
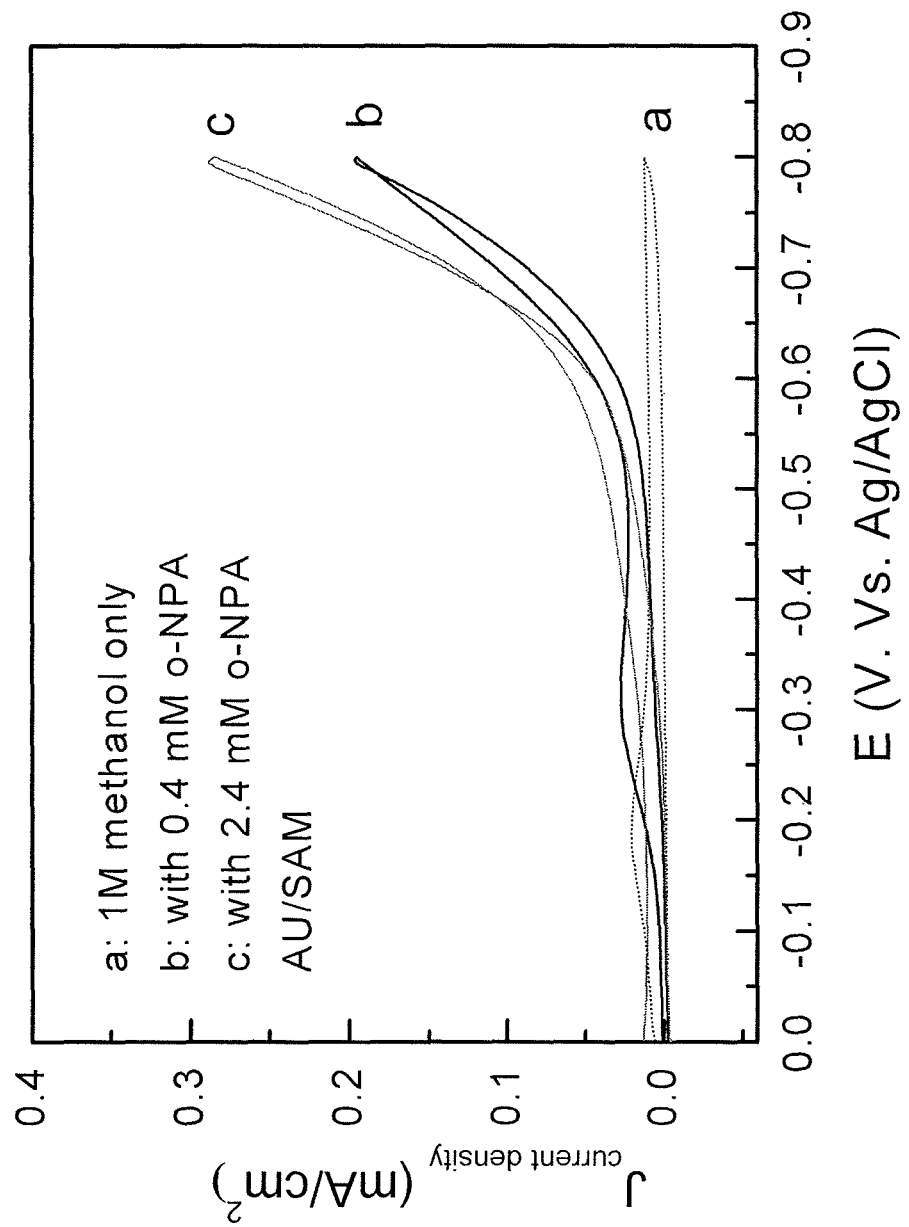

FIG. 8 is another graph showing the E-R effect on the current density by comparing a gold/SAM electrode, with, or without o-NPA, at a 20 mV/s scan rate for both experiments. The media used was 1M methanol without oxygen, and without electrolyte, at room temperature and in a quiet and non-stiffing condition.

Figure 9A:
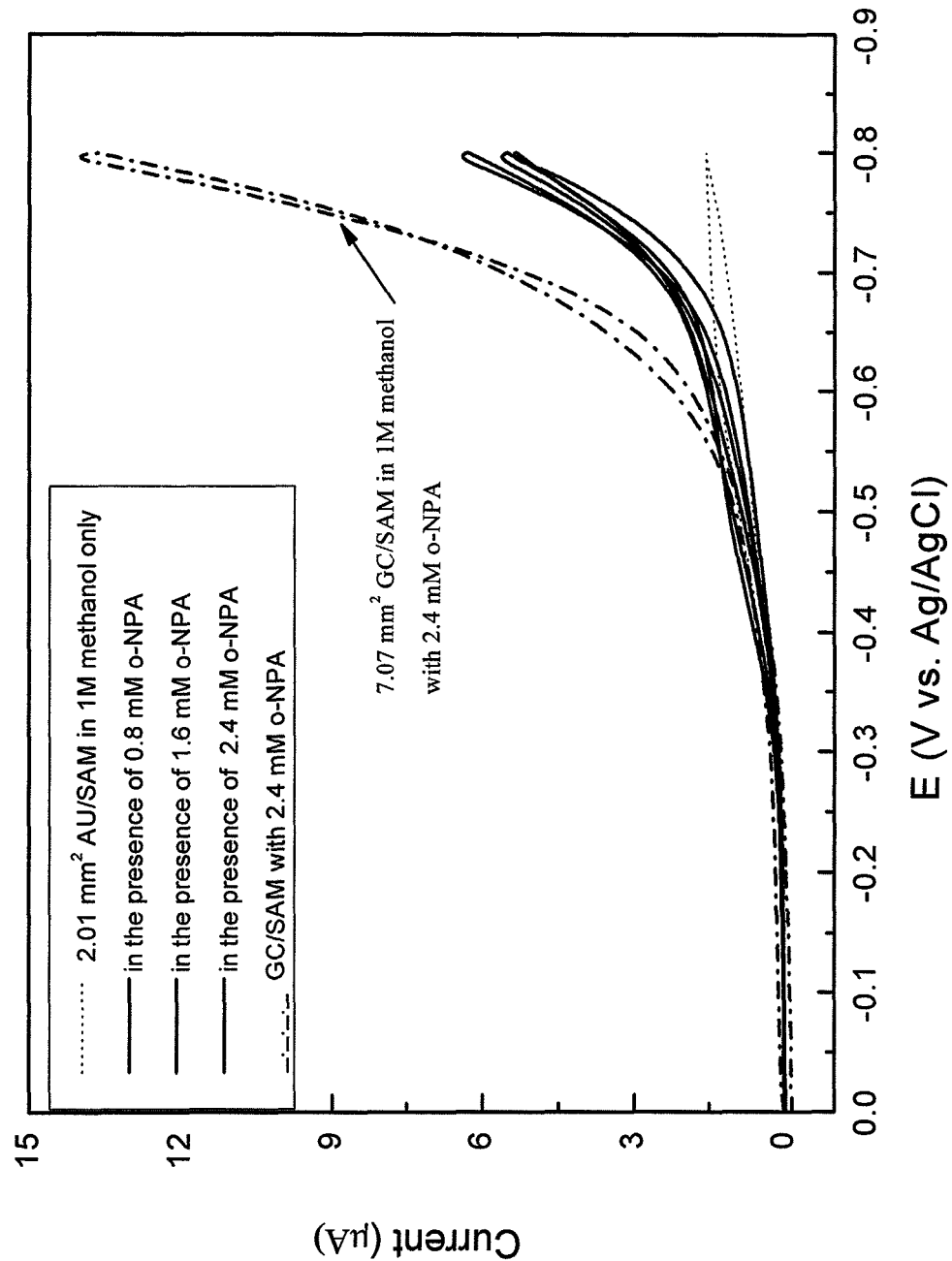

FIG. 9A is a graph depicting the comparison of the CV profiles with, or without o-NPA, with Au/SAM electrodes and GC/SAM electrodes in 1 M methanol, respectively, using the fabrication method reported in U.S. Patent Application No. 2008/0237063.

Figure 9B:
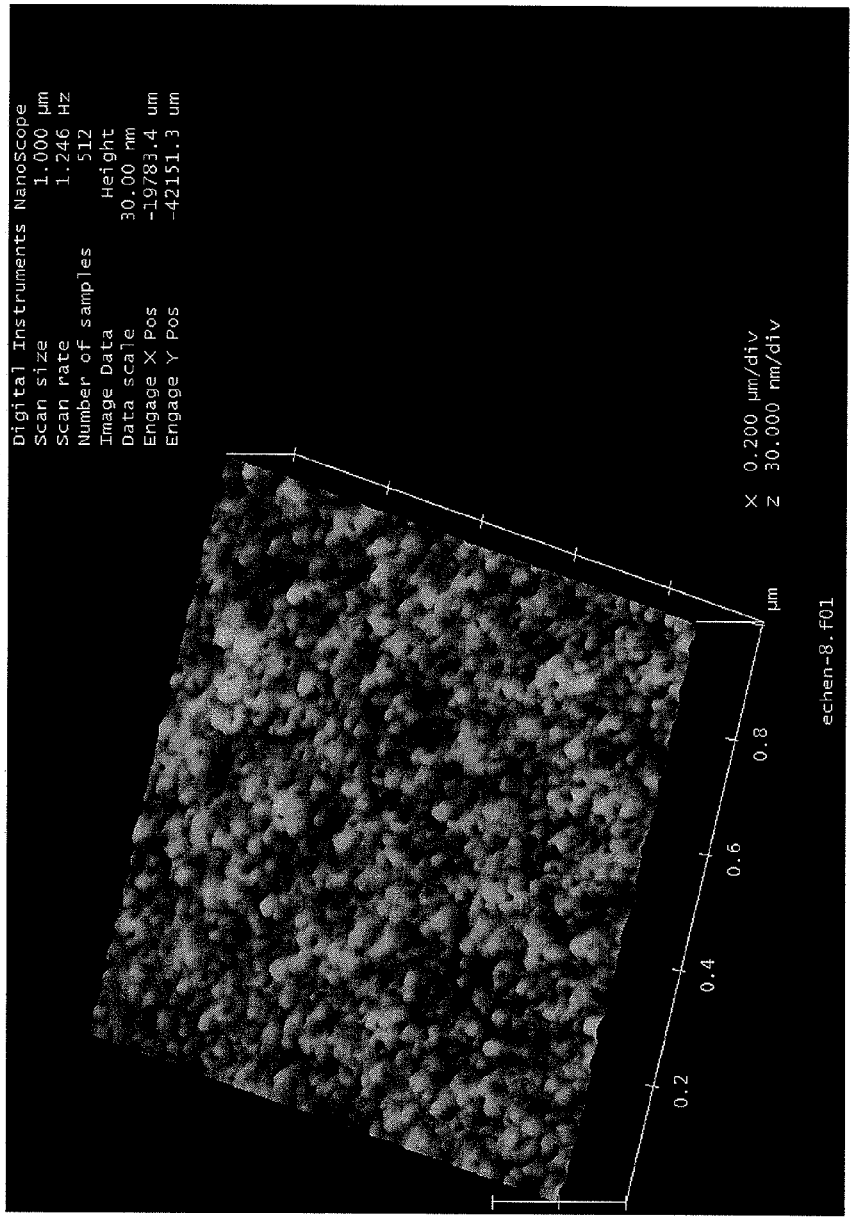

FIG. 9B is an AFM image of AU/SAM with an average 20 nm nanopore.

Figure 9C:
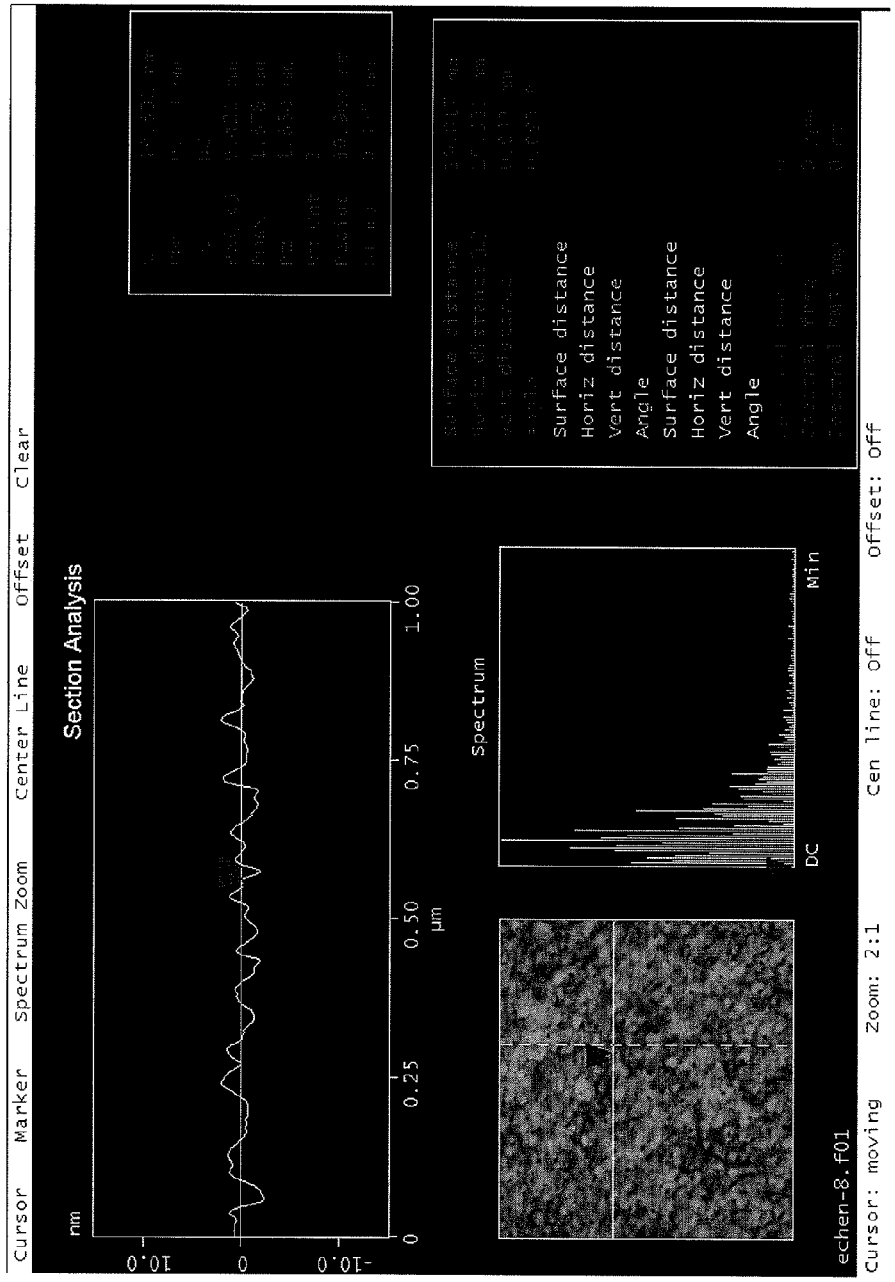

FIG. 9C is a photo of the section analysis of the AU/SAM of FIG. 9B.

Figure 9D:
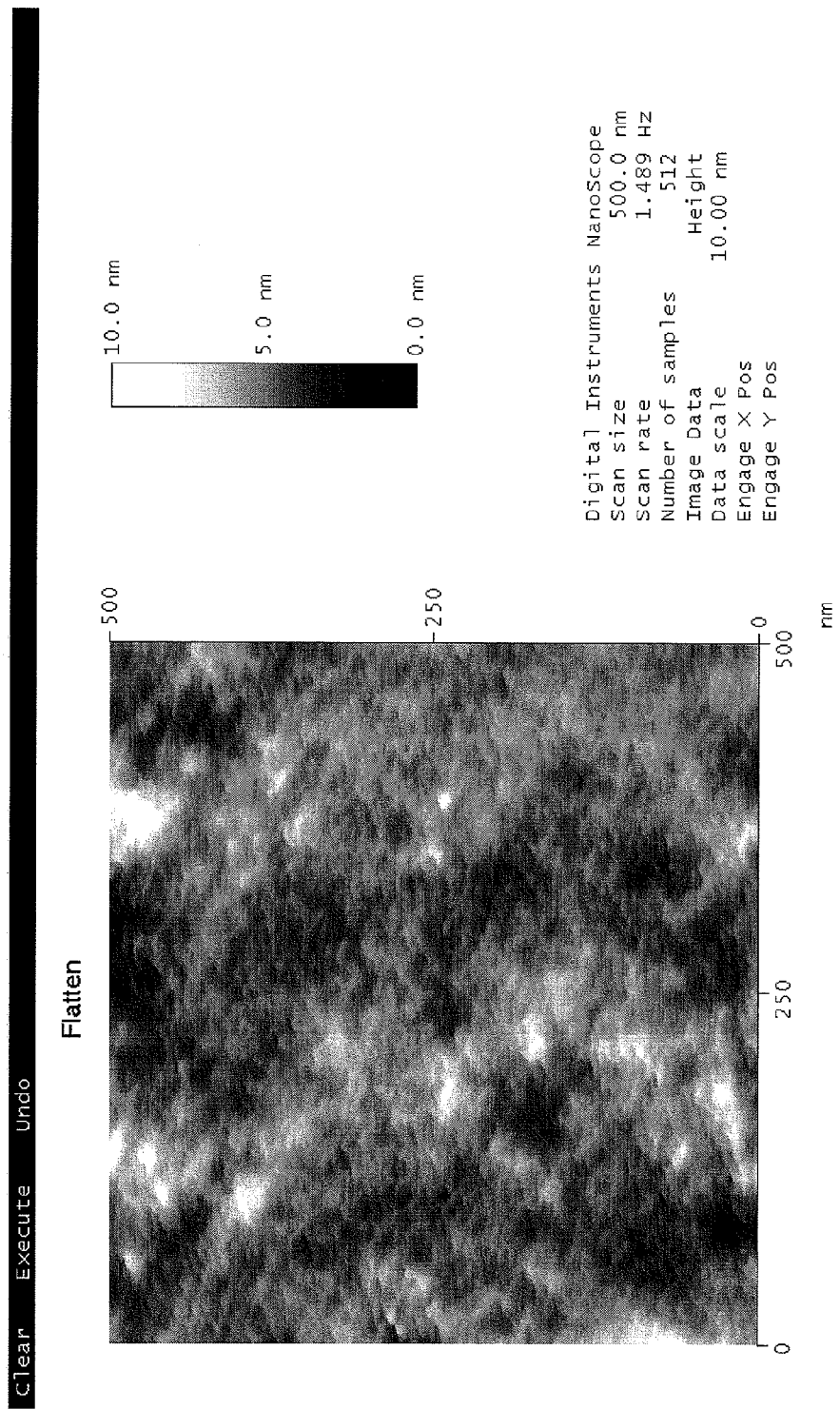

FIG. 9D is the AFM image of the GC/SAM under the same fabrication method as FIG. 9A.

Figure 9E:
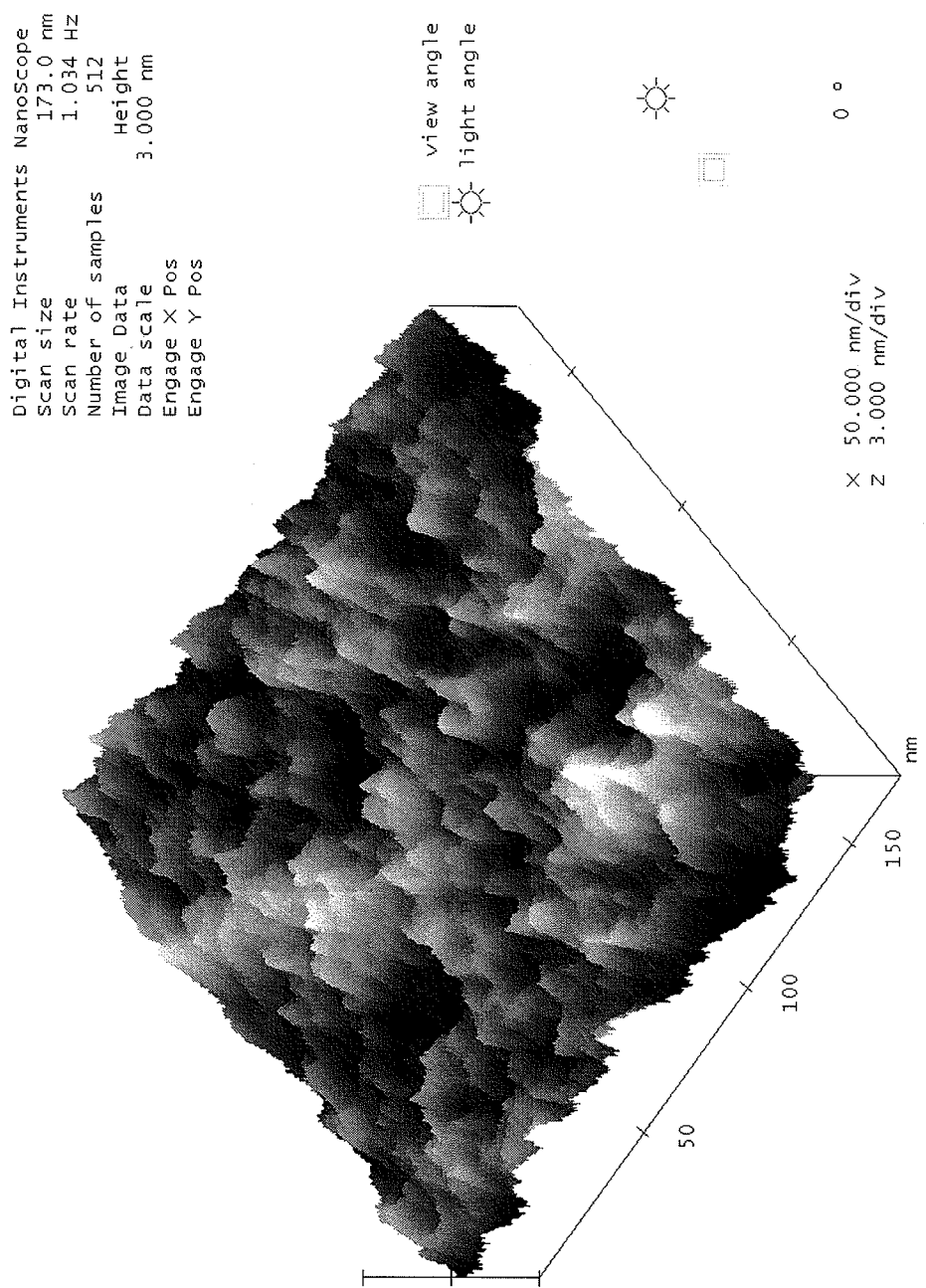

FIG. 9E is 3D AFM view of the GC/SAM.

Figure 9F:
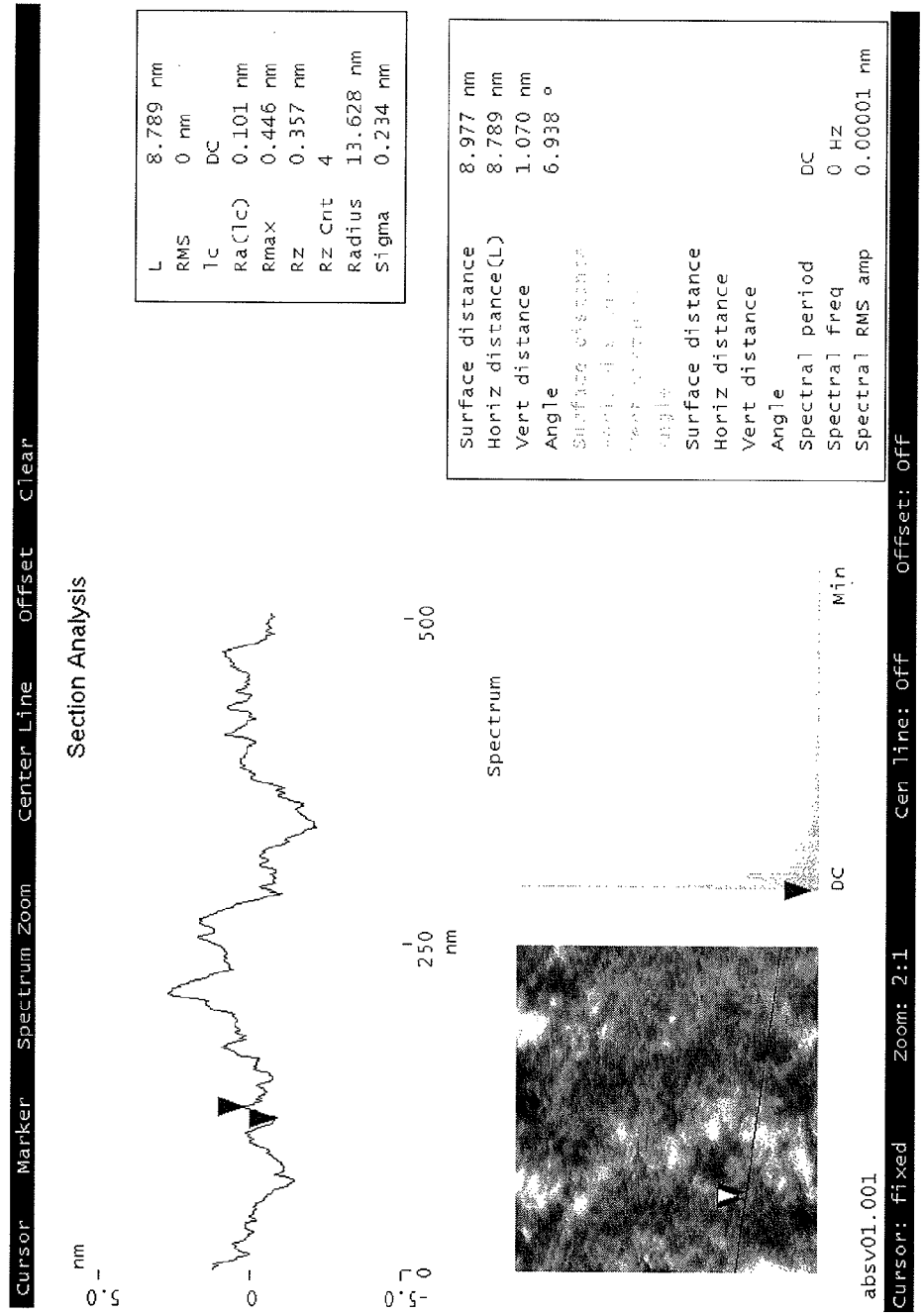

FIG. 9F is a photo of the section analysis of the GC/SAM.

Figure 10:
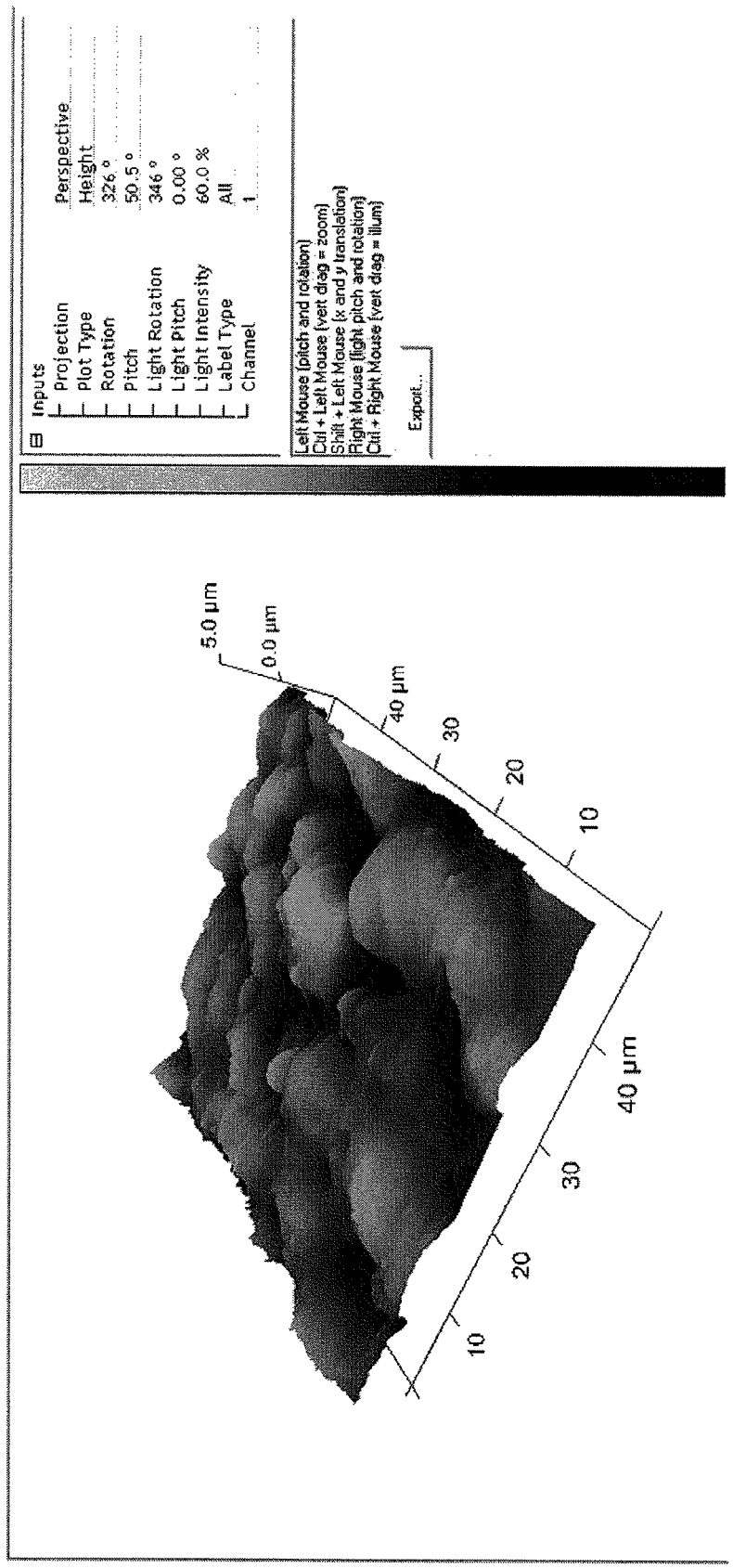

FIG. 10 is an AFM image of an embedded "reactant" o-NPA into a SAM polymer block with the membrane thickness of 5.4 μm. The fabrication method is described below.

Figure 11:
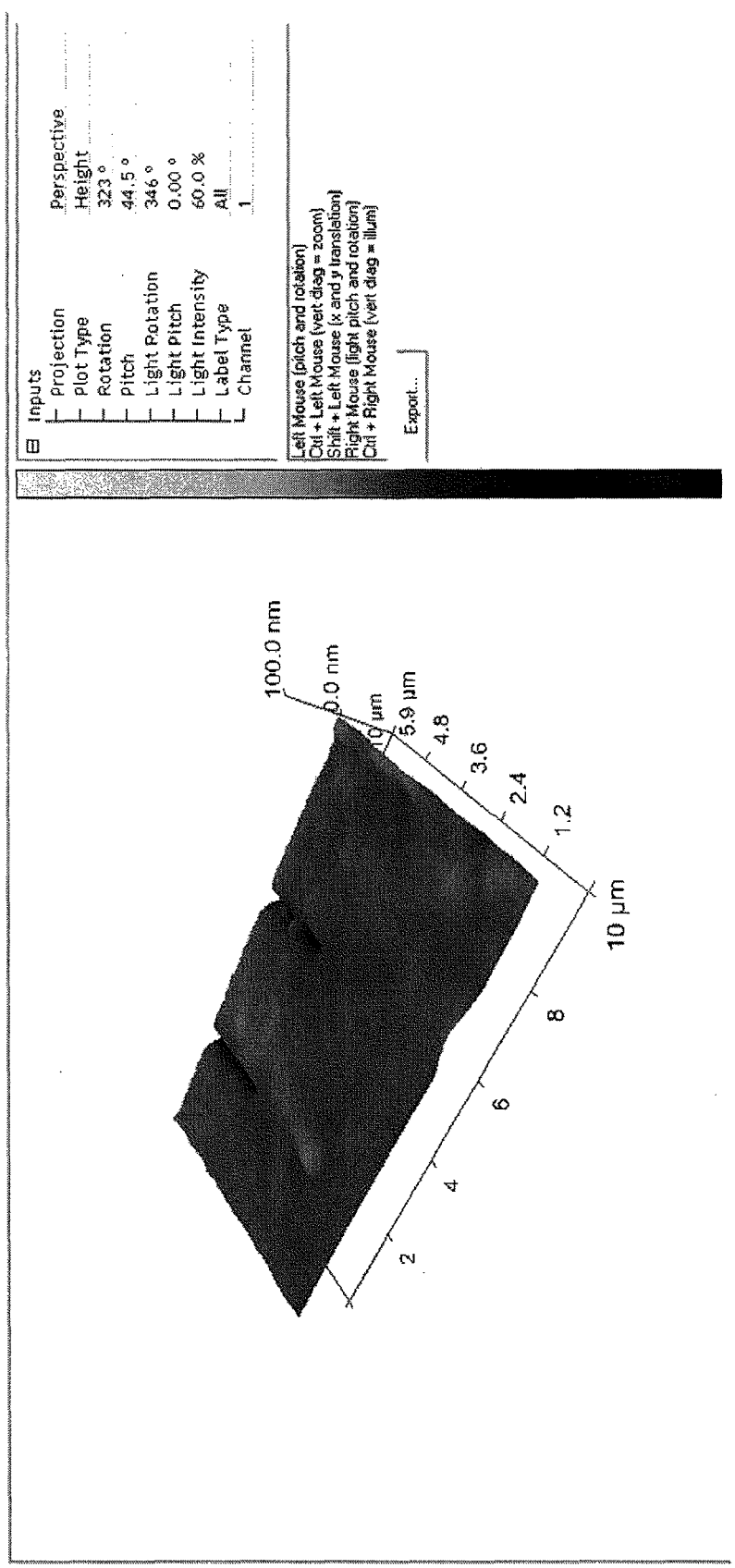

FIG. 11 is an AFM image of an embedded "reactant" o-NPA into a SAM polymer block with the membrane thickness of 48 nm.

Figures 12A, 12B:
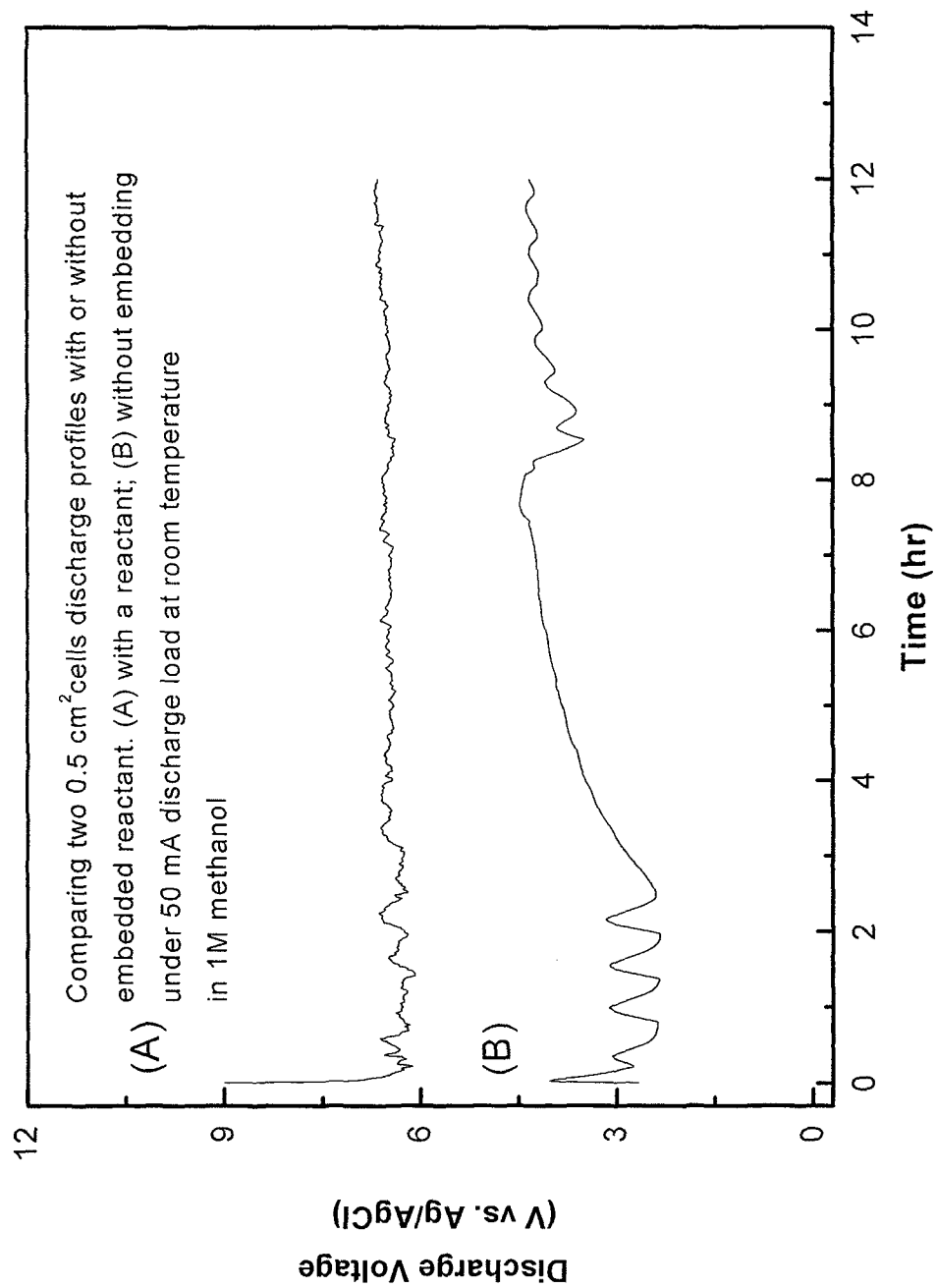

FIG. 12A is a set of graphs illustrating the advantage of higher nominal discharge voltage of 6.7 V for 12 hours at room temperature for a 0.5 cm$^2$ GC/SAM with embedded o-NPA (a membrane thickness 48 nm), when compared with the same 0.5 cm$^2$ GC/SAM without embedding, and only has 2.4 mM o-NPA in the 1M methanol media.

FIG. 12B shows that the 0.5 cm$^2$ GC/SAM DMFC without embedded o-NPA has a nominal discharge voltage which is 58% of one having the embedded o-NPA. Both curves have the same discharge load of 50 mA with the current density of 100 mA/cm$^2$.

Figure 13:
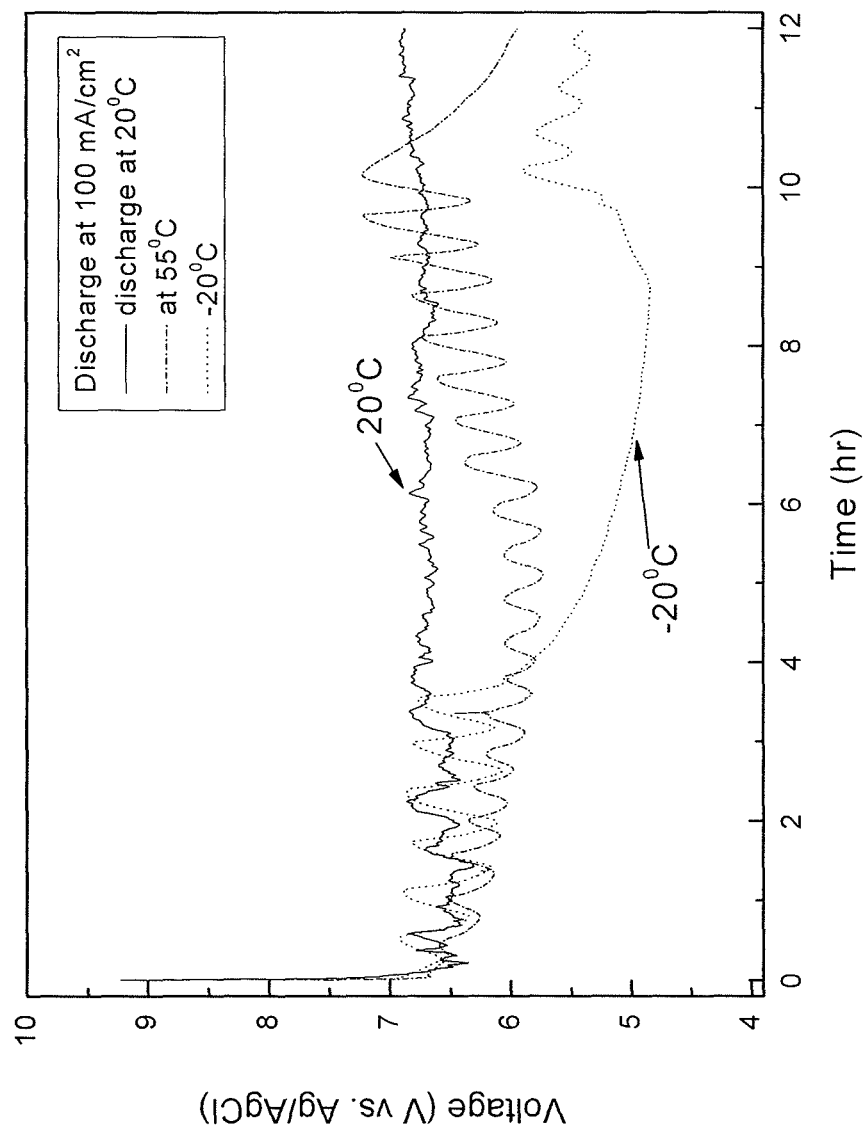

FIG. 13 is a graph showing the effect of temperature on a 0.5 cm$^2$ GC/SAM fuel cell of the present invention, discharging at −20° C., 20° C. and 55° C., respectively.

Figure 14:
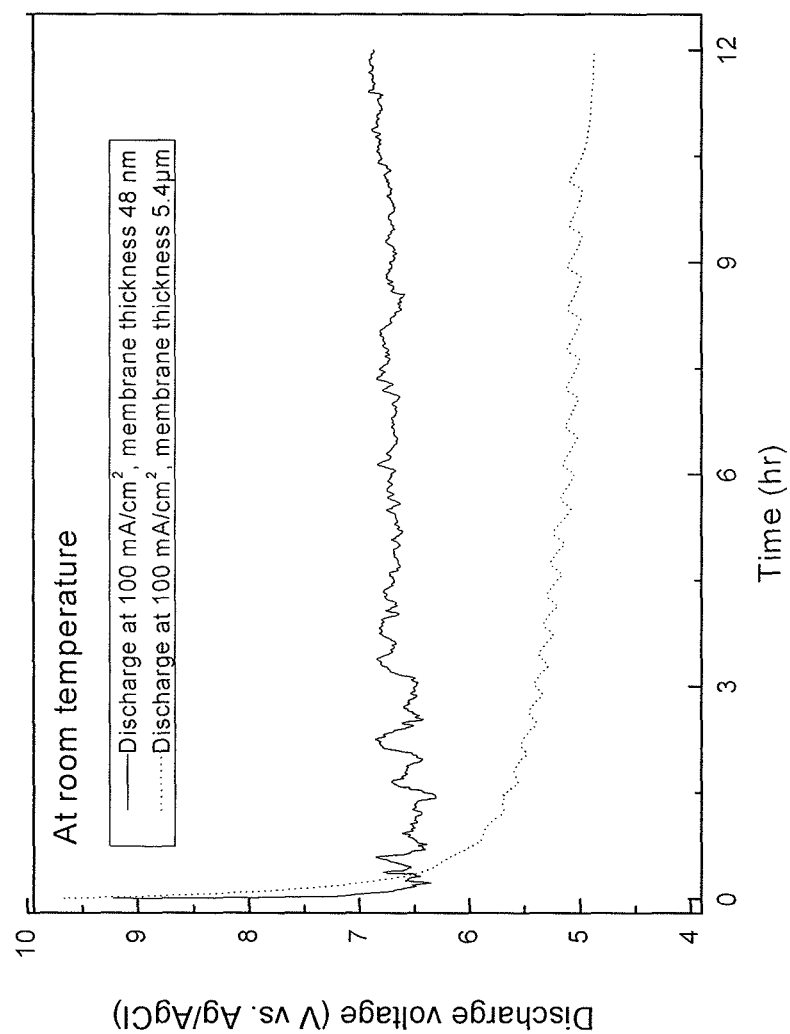

FIG. 14 is a graph showing the effect of the membrane thickness on the discharge voltage profiles, by comparing two 0.5 cm$^2$ GC/SAM cells with membranes of 48 nm (above) and 5.4 μm (below), at room temperature with a 50 mA discharge rate that has 100 mA/cm$^2$ current density.

Figure 15:
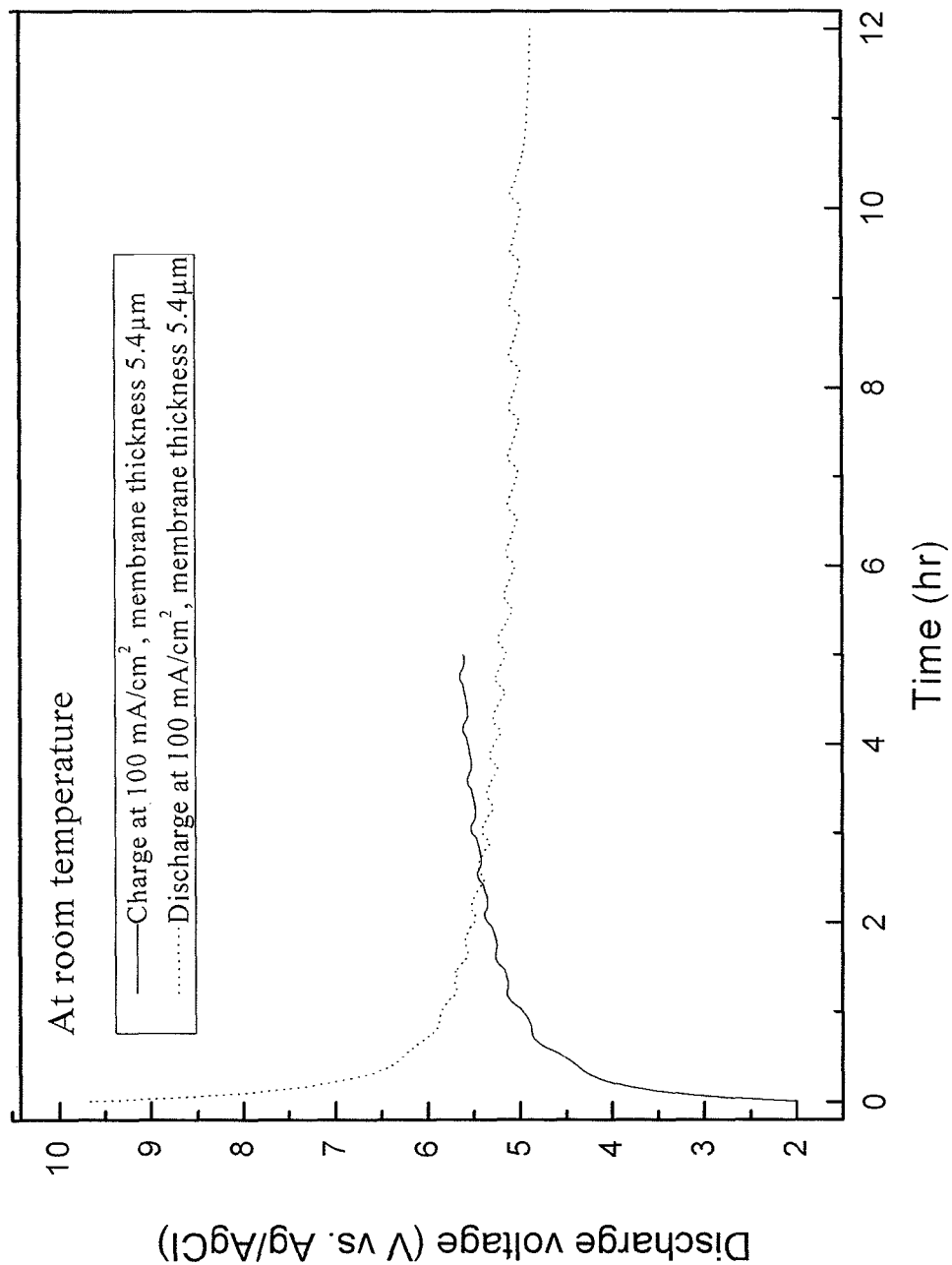

FIG. 15 is a graph depicting the efficiency of charge/discharge with the GC/SAM device of the present invention having a 5.4 μm membrane, at room temperature.

Figure 16:
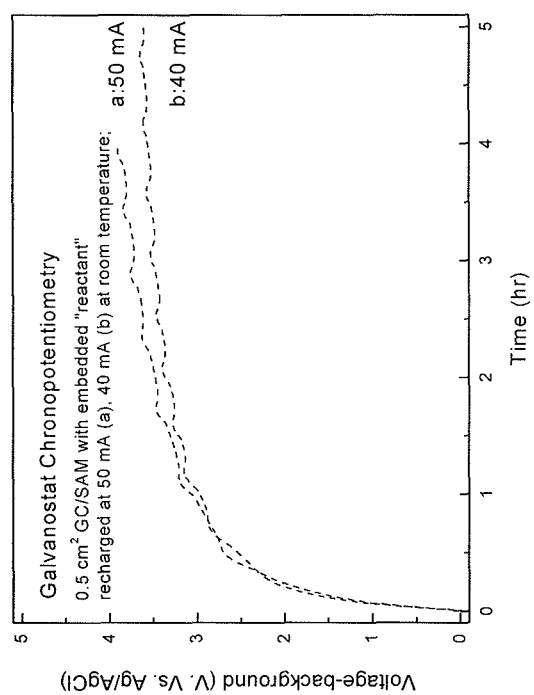

FIG. 16 is a graph depicting the rechargeability of the 0.5 cm$^2$ GC/SAM single DMFC cell embedded with o-NPA, of the present invention, in 1M methanol charged at 50 mA (a), and recharged at 40 mA (b) at room temperature.

Figure 17:
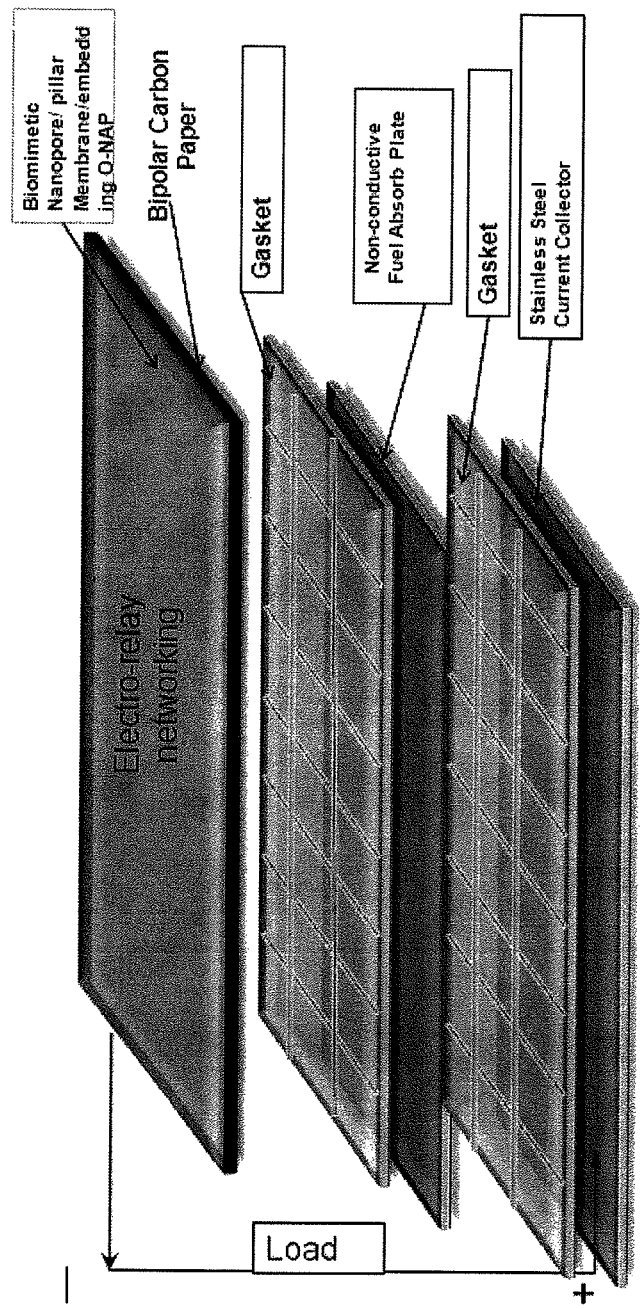

FIG. 17 is an illustration of an embodiment of the fuel cell device of the present invention.

DETAILED DESCRIPTION OF THE INVENTION

As the industry turns to "Green Energy" sources, it is necessary for us to learn from nature and seek its inspiration. Fibroblast growth factors (FGFs) are well known proteins. They play important roles in embryonic development, angiogenesis, wound healing, and malignant transformation. Studies of their x-ray crystallography structure show a "guest-host" inclusion between inhibitors (oxindole core (indolinones)) and tyrosine kinase. The active catalytic receptors amino acids for Fibroblast growth factor receptor 1 (FGFR1), have been reported by the inventor to be phenylalanine (F489) and Asn (N568) (U.S. Patent Application No. 2008/0237063). The phenyl ring of Phe489 in the FGFR1-inhibitor structure is stabilized by an extensive network of oxygen-aromatic interactions near the plane of the ring. The beauty of the "guest-host" interaction between FGFR1 and the inhibitor (pyrrol ring indolinone) is the promise of system stability and the inducing flow of current through the electron-relay network if a potential is applied.

The fuel cell device of the present invention is based on biomimetic electron-relay (BER). The phenyl group of NPA was introduced to mimic this F489, then the COO$^-$ group of triacetyl-cyclodextrin (T-CD) formed a hydrogen bond with the mimic F489 (T-CD acts as an inhibitor), and a nitrogen at poly (4-vinylpyridine) (PVP), was used to provide a mimic of the active sites of residue Asn568 (expressed as N568) and residue Asn 628 (expressed as N628). As such, in an embodiment, the electrorelay sites of the present invention are connected through our T-CD-NPA-PVP construct, in a methanol media. When the built-in reactant of nitrophenyl acetate (o-NPA) enters the active sites of the receptor, it promotes spontaneous direct electron transfer (DET) current to flow from the active sites to the electrode, when in the presence of methanol.

In an embodiment, the membrane of the device of the present invention is made up of nano-structured, conductive, cross-linking polymers. It uses the electron-relay system as a catalyst; hence, there is no need for costly platinum (Pt) powders. It also uses ordinary carbon as a working electrode. The fuel, methanol, acts as a media solvent and not a reactant, so it can be reusable; it would not be contaminated because there is no by-product produced. The only key reactant is a hydrophobic, aromatic acetate, such as, for example, o-NPA, which is a component of the electron-relay system. The DMFC cell is capable of functioning at room temperature, and at a neutral pH, so there is no corrosion.

In an embodiment, the present invention provides a direct fuel cell comprising an electrode and a first cyclodextrin in the structure of mix of nanopillars and nanopores and which is chemically modified to be able to form electron-relay with other functional groups of a polymer matrix. It is contemplated that in an embodiment, the electrode of the device of the present invention comprises gold or glassy carbon as substrate. In an embodiment, the polymer matrix of the fuel cell of the present invention is cross-linked through self-assembly.

In accordance with the fuel cell device of the present invention, the first cyclodextrin comprises at least one acetyl group. In another embodiment, the first cyclodextrin is triacetyl-β-cyclodextrin (T-CD).

In accordance with the fuel cell device of the present invention, the first cyclodextrin comprises a biomimetic complex which mimics the interaction of fibroblast growth factor receptor (FGFR) 1 and an inhibitor. In another embodiment, the inhibitor is o-nitrophenyl acetate (o-NPA).

In another embodiment the present invention provides that o-NPA can have at least three functions. The first is to provide a benzene ring that mimics Phe$^{489}$ of FGFR1 for the "guest-host" inclusion with the hydrophobic cavity of T-β-CD. The second is to form hydrogen bonding with the COO group of T-β-CD. The third is to provide a COO group to mimic ASP$^{641}$.

As used herein, the term "insulator" means any insulator which prevents electron flow as known in the art.

As used herein, the term "current collector" means any conductive material used to collect electrons or direct electron flow, as known in the art.

In another embodiment the present invention provides that the COO group of T-β-CD can mimic the function of an inhibitor of 3-[(3-(2-carboxyethyl)-4-methylpyrrol-2-yl)methylene]-2-inolinone.

In accordance with the fuel cell device of the present invention, the polymer matrix has a mixture of nanopillar and nanopore structures with the pillars and pores are vertically oriented on the polymer substrate surface. In an embodiment, the pore size of polymer matrix is between about 20 nm to about 40 nm in diameter. In another embodiment, the nanopillars on the polymer matrix are in the range of about 10 nm to about 40 nm in diameter, and have an average length (z direction) of between about 2 nm to about 4 nm.

In another embodiment, the present invention provides that the pores of the first cyclodextrin molecules are about 0.5 nm to about 0.7 nm in diameter.

In an embodiment, the present invention provides that within the SAM the first cyclodextrin is cross-linked with a polymer. In an embodiment, the polymer comprises poly-4-vinylpyridine (PVP). It is contemplated, that the PVP in the device of the present invention has dual functions of mimicking the Asn$^{568}$ and Asn$^{628}$ amino acid residues of FGF, respectively.

In a further embodiment, in the fuel cell device of the present invention, the polymer comprises a β-Cyclodextrin/epichlorohydrin co-polymer. In an alternate embodiment, the polymer matrix comprises polyethylene glycol (PEG). In another embodiment, the polymer matrix of the present invention comprises a mixture of T-CD, PVP, PEG and β-Cyclodextrin/epichlorohydrin co-polymer.

In accordance with an embodiment, the present invention provides a fuel cell device, wherein o-NPA is embedded with the polymer matrix to form a membrane where the o-NPA mimics the amino acid residues Phe489 and Asp 641 in the FGFR1-inhibitor complex.

In a further embodiment, wherein the polymer matrix embedded with o-NPA has a thickness of at least about 48 nm to about 5.4 µm thickness through a controllable procedure. Preferably, the thickness is from about 50 nm to about 2 µm. In another embodiment, the polymer matrix embedded with o-NPA are poreless.

In accordance with an embodiment, the energy storage/converting device of the present invention is a direct methanol fuel cell.

In another embodiment, the fuel cell device of the present invention can function as an amperometric sensor that is capable of detecting o-NPA with a sensitivity of at least about 7.54 µA/mM (using the 1 cm$^2$ GC/SAM sensor) up to about 3.2 mM when applied a potential.

In a further embodiment, the fuel cell device of the present invention can function as a voltammetric sensor, that has a capability to reversibly accelerate the current increase towards positive and negative directions relative to the increase of o-NPA concentrations, when a scan voltage is applied from 0 to −800 mV, with a rate of 20 mV/s. The current density achieved is proportional to the o-NPA concentration and the highest current density of at least about ±100 mA/cm$^2$.

In a further embodiment the fuel cell device of the present invention provides a reversible CV curve has a typical 45° degree angle against the X axis. The 45° angle CV signal is an indicator, that labels a transition status from "sensor" (polarized) to an idea non polarized "capacitor" or "fuel cell" state.

In a further embodiment, the fuel cell device of the present invention, wherein said the concentration of o-NPA in the membrane is changed from 0.4 mM to 3.2 mM, and the open circuit potential signal was inversely proportional to the "reactant" o-NPA concentrations, the OCP curves move toward more negative potential field by 3.5-fold, which indicates the existence of a relationship between the E-R effect and the fuel cell performance. It is contemplated that the source of energy comes directly from an E-R effect that induced or created the larger OCP difference under a gradient "reactant" concentration.

It will be understood that in an embodiment of the fuel cell device of the present invention, the OCP and the concentration of o-NPA has an accelerative exponential decay relationship between the normalized open circuit potential, and the o-NPA concentrations, by a nonlinear curve fitting method, with the first order exponential decay rate constant 0.61 OCP unit/mM.

In accordance with an embodiment, the fuel cell device of the present invention is oxygen-free and air-independent. In another embodiment, the fuel cell device of the present invention is non flammable from 1 M to 3M methanol in water, i.e., 3.2% methanol in water (1M).

In accordance with an embodiment, the fuel cell device of the present invention is is electrolyte-free, i.e., without acid or base, hence corrosion-free.

In accordance with an embodiment, the fuel cell device of the present invention is catalyst-free, for example, free of Pt.

The following examples further illustrate the invention but, of course, should not be construed as in any way limiting its scope.

Example 1

This example demonstrates the concept of the BER membrane of the present invention.

Figure 1:
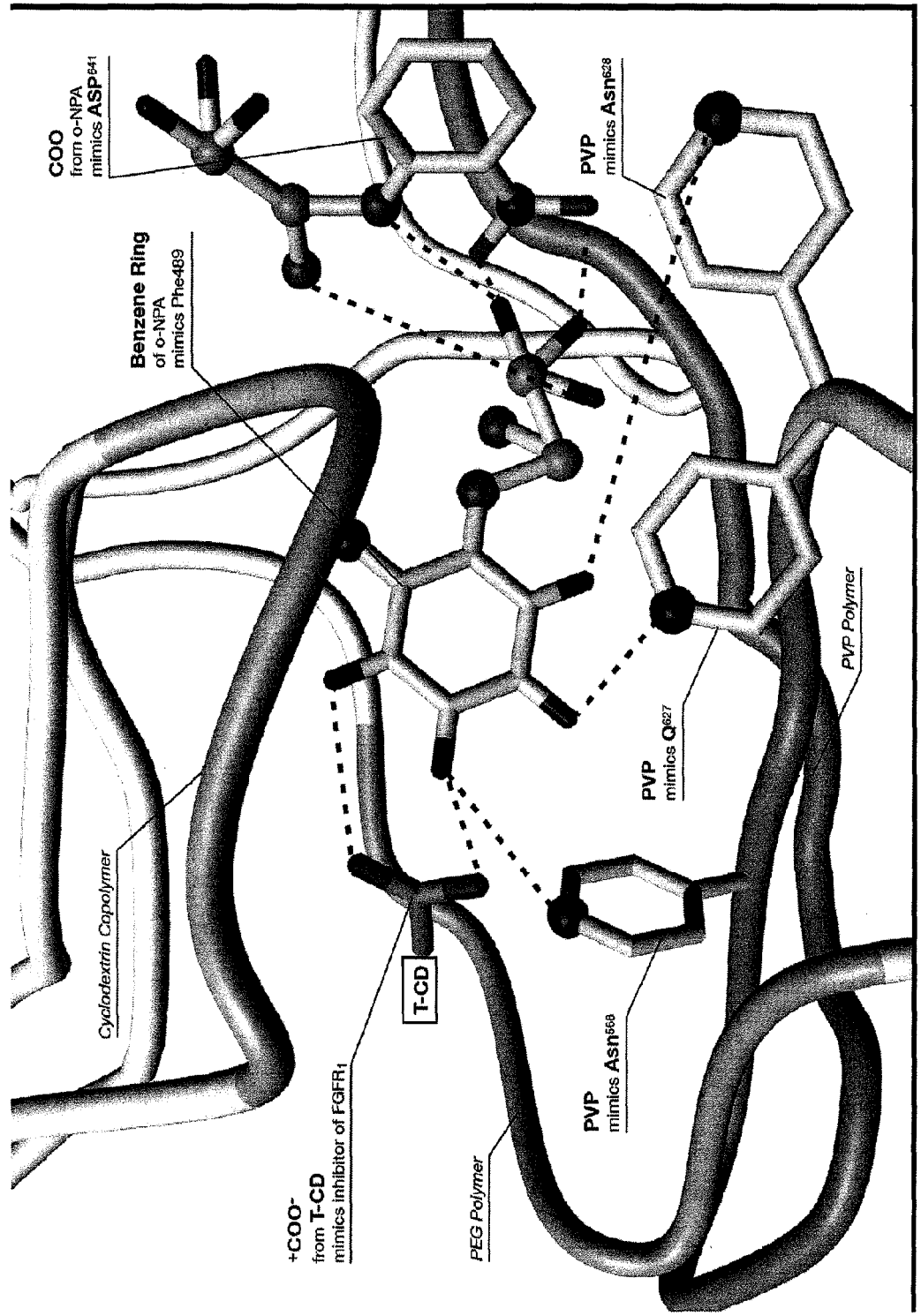

FIG. 1 illustrates the conceptive BER membrane of the fuel cell of the present invention. The BER membrane is consistent of a self-assembling membrane (SAM) by a conductive cross-linking polymer with triacetyl-β-cyclodextrin (T-CD) cross-linked with PEG, PVP and β-CD co-polymers on a 1.0 $cm^2$ glassy carbon (GC) electrode as the working electrode (anode) for a fuel cell. The advantage of the electron-relay system is the ability to carry out of a spontaneous redox reactions and inducing electron flow between the receptor centers in the membrane and the surface of the working GC electrode without broken the methanol molecule when the substrate, aromatic acetate, enters the network frame. It is an intricate processing to enhance the discharge power of electricity without demanding of an electrolyte to transfer charges, because the electron-relay network has stimulated the entire fuel cell system due to the hydrophobic aromatic acetate hydrogen bonding, "host-guest" interaction with the receptors.

Example 2

The following example provides methods for fabricating the nano-structured SAM on a 1 $cm^2$ GC electrode.

The 1 $cm^2$ GC electrode was purchased. Polyethylene glycol diglycidyl ether (PEG) was purchased from Sigma (St. Louis, Mo.). A T-CD solution was prepared (8-10 g/l) in methanol. A poly(4-vinylpyridine) (PVP) solution was also prepared (0.4-1.0 g/l) in 10 mM 4-(2-hydroxyethyl)-1-piperazine-ethanesulfonic acid (HEPES) that contained 50% methanol and a β-CD copolymer (0.01-0.03 g/ml) in HEPES. All prepared solutions were filtered, sonicated, and degassed. The polymer mixture solution was made of 20-35%:10-20%: 25-30%:15-45% (v/v) by T-CD: PEG: PVP: CD polymer, respectively. The 1 $cm^2$ GC electrode was cleaned before use by a commonly used procedure. The 200 μl mixture solution was injected onto one side of the surface of the GC electrode in a certified class 100 level of a clean room and was incubated for 48 hours at 35° C. in an incubator. After that, the GC/SAM electrode was washed by extra pure DI water for 10 minutes, then was re-incubated for 2 hours at the same temperature, and after that, the electrode was stored at room temperature.

Example 3

The following example describes the characterization of the membrane of the GC/SAM electrode.

Figure 2A:
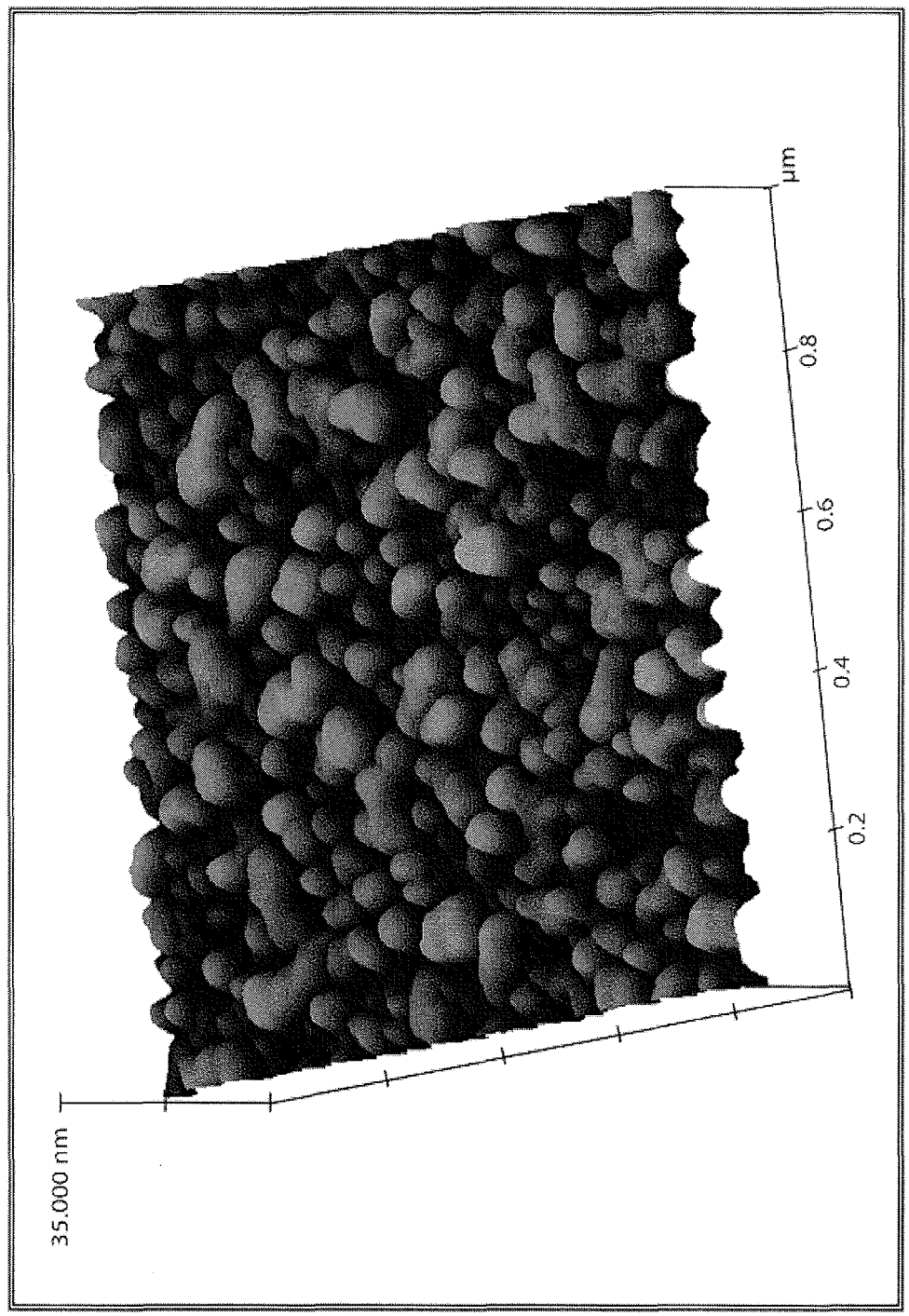

The morphology of the 1 $cm^2$ GC/SAM electrode was characterized by using an instrument (Digital Instruments Nanoscope, Atomic Force Microscope, Veeco Instruments, CA). The surface structure was scanned using a silicon cantilever and a tip with 5-10 nm radius as shown in FIG. 2. The nanopillars and nanoporous can be seen. Nanopillars are in the range of about 10 nm to about 40 nm in diameter with an average length (z direction) of about 2 nm to about 4 nm. The pores are in the range of about 20 nm to about 40 nm in diameter.

Example 4

The following example describes the construction of the direct methanol fuel cell (DMFC).

The cell consists of a 1 $cm^2$ GC working electrode with a nanostructured SAM, a Pt thin wire auxiliary electrode, a Ag/AgCl reference electrode in 1M methanol, a vial covered with a lid with two thin tubes, one for purging nitrogen in, and the other is for a use as a nitrogen blanket. Hence, the cell worked in an oxygen free environment as seen in FIG. 3. The cell was placed in a C3 cell stand (BASi, IN). Before the experiment was started, the methanol was thoroughly purged with nitrogen, and kept under a nitrogen blanket during the experiment. The electrodes were connected through lead clip connectors, and a cable from the C3 stand connected to the Epsilon Potentiostat/Galvonostat working station (BASi, IN), which was connected to the computer for acquisition of data and for data analysis with the Epsilon software package. Data shown in FIGS. 4-9 use this experimental arrangement.

Example 5

The following example describes the evaluation of the effect of temperature on the GC/SAM of the present invention.

Figure 3B:
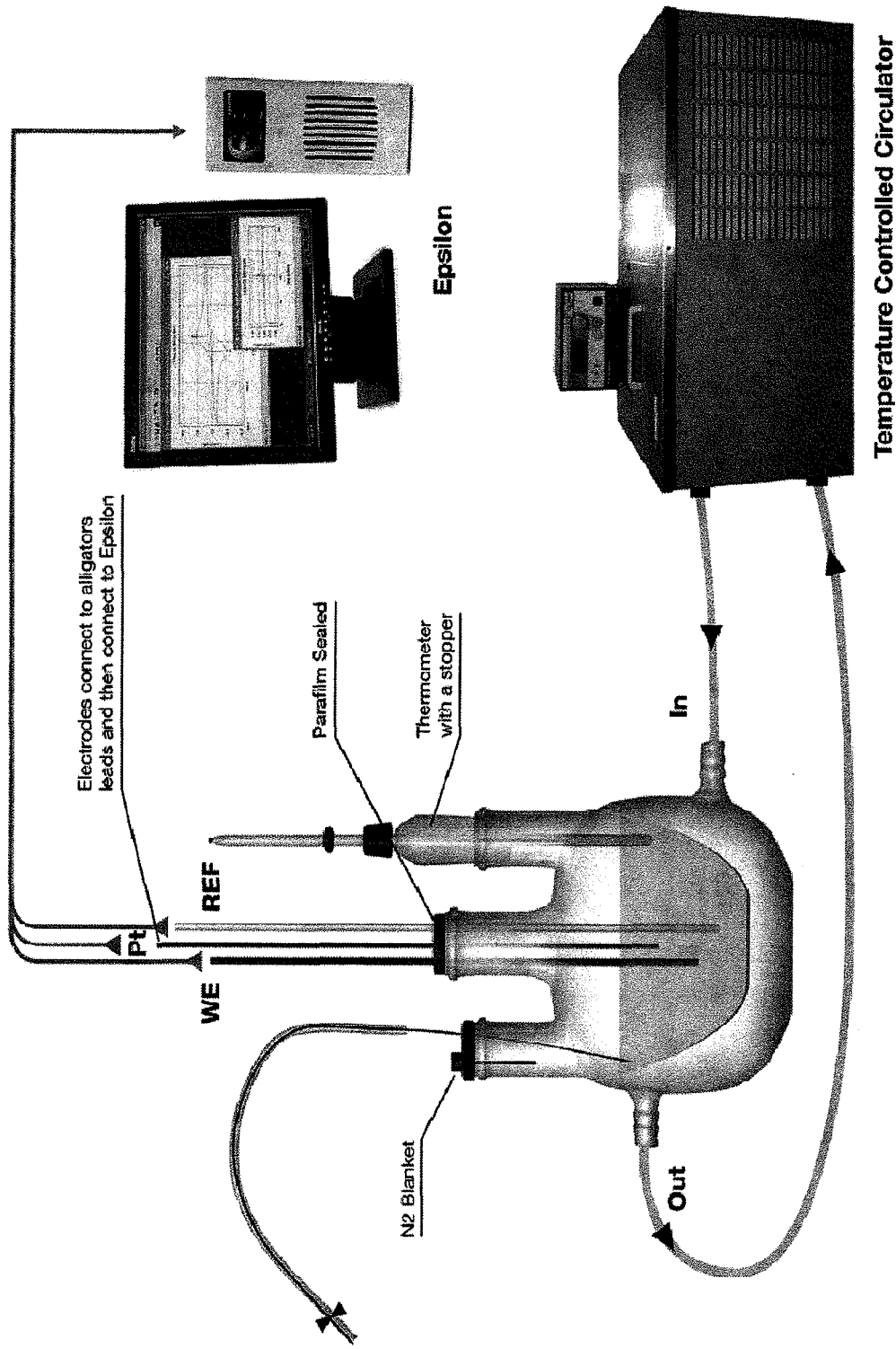
FIG. 3B is an illustration of the set up of an embodiment of the present invention for use in studying the effect of temperature from −20 to 55° C.

A three-neck, round bottom heavy double water jacked flask was set up as shown in FIG. 3B, and connected with a temperature controlled circulator filled with ethylene glycol. The working electrode of GC/SAM was in the flask connected through a conductive wire and then the wire was connected to an alligator lead cable. The cable was connected to the electrochemical equipment (Epsilon, BASi, IN). Data acquisition and analysis with the software package was obtained through a computer. The reference electrode Ag/AgCl was inserted through the neck into the 1M methanol and the auxiliary electrode was Platinum (Pt) was also in the solution. The reference and the auxiliary electrodes were connected to two alligator lead cables through conductive wires, then were connected to the electrochemical equipment using the method described for the working electrode, and the open neck was covered after the electrodes were installed inside of the flask. Two separated small tubes for nitrogen purge inlet and outlet were connected with a controlled flow meter, which connected to a nitrogen cylinder. The third neck was used for a thermometer. All the glass necks were covered before starting the experiment. The 0.5 $cm^2$ cell discharge was set at −50 mA using the Galvanostat Chronopotentiometry (GCP) method at 20, 55 and −20° C., respectively. All experiments were under nitrogen purge for 30 minutes and after that nitrogen blanket. Data shown in FIGS. 12-16 use this experimental arrangement.

Example 6

The following example details the electrochemical characterization of the electrodes of the present invention.

The cell of the present invention comprises a working electrode (GC or gold) with a nanostructured SAM, a platinum (Pt) thin wire auxiliary electrode and a gold Ag/AgCl reference electrode in a vial. The vial contains 1M methanol, and is covered with a lid that has two thin tubes, one is for purging nitrogen, and the other is for a nitrogen blanket. The cell was in a cell stand (model C3, BASi, IN) and was connected with the Potentiostat/Galvonostat working station (Epsilon, BASi) for data acquisition and analysis with the software package. There was no electrolyte. The o-NPA solutions were added to the 1M methanol for evaluation of the cell performance. The open circuit cell potential (OCP) method was used for evaluation of the cell power voltage without polarization. The OCP cell voltage is measured between the working electrode (anode) and the reference electrode; hence, the Pt electrode was disconnected from Epsilon. The Galvanostat Chronopotentiometry (GCP) method was used to evaluate the cell rechargeable capability with a 6 $\mu A/cm^2$, and a 100 $mA/cm^2$ DC constant current charge of the cell, respectively at without embedding o-NPA and with embedding, respectively. The cyclic voltammetry (CV) method was used for study the E-R effect and NPA concentration effect on current density with a scan rate of 20 mV/s. All experiments were conducted using three electrodes, except the OCP method, at room temperature in oxygen-free and electrolyte-free situation.

Example 7

The cell consists of a working electrode (GC or gold) with a nanostructure SAM, a platinum (Pt) thin wire auxiliary electrode and a gold Ag/AgCl reference electrode in a vial has 1M methanol covered with a lid that has two thin tubing, one is for purge nitrogen in, and the other is for nitrogen blanked purpose. The cell was in a cell stand (model C3, BASi, IN) and was connected with the Potentiostat/Galvonostat working station (Epsilon, BASi) for data acquisition and analysis with the software package. There was no electrolyte. The o-NPA solutions were added to the 1M methanol for evaluation of the cell performance. The open circuit cell potential (OCP) method was used for evaluation of the cell power voltage without polarization. The OCP cell voltage is measured between the working electrode (anode) and the reference electrode; hence, the Pt electrode was disconnected from Epsilon. The Galvanostat Chronopotentiometry (GCP) method was used to evaluate the cell rechargeable capability with a 6 $\mu A/cm^2$, and a 100 $mA/cm^2$ DC constant current charge of the cell, respectively at without embedding o-NPA and with embedding, respectively. The cyclic voltammetry (CV) method was used for study the E-R effect and NPA concentration effect on current density with a scan rate of 20 mV/s. All experiments were conducted using three electrodes, except the OCP method, at room temperature in oxygen-free and electrolyte-free situation.

Example 8

The following example describes the electro-relay function of the fuel cell device of the present invention.

Direct electron transfer (DET) between enzymes and electrode has been extensively studied. The intriguing phenomena known as bioelectrocatalysis DET offers advantages that were previously reported, such as a mediator-free and enzyme-free, direct detection of analyte can be reached reported by the inventor. Here, is disclosed for the first time, a multiple-receptor E-R molecular architecture used for enhancing DMFC performance. The original polymer block of T-CD cross-linked with PEG, PVP and β-CD co-polymers provided an E-R with a DET effect without the presence of o-NPA. It can now be shown that after adding o-NPA into the 1M fuel cell, the aromatic phenyl group enters the active site and forms hydrogen bonds with T-CD, and poly (4-vinylpyridine) (PVP). Through hydrogen binding, hydrophobic interaction or "host-guest" inclusion, the E-R net work promotes high power density for the fuel cell.

FIG. 4 illustrates the E-R effects on the current density. The magnitude of differences of current density between the polymer matrix with, and without, o-NPA indicate the E-R effect creates a "power switch" that moves the charge and discharge current density difference by ±100 folds apart. The reversible CV curve has a typical 45° degree angle against the X axis. The 45° angle CV signal is an indicator, that labels a transition status from "sensor" (polarized) to an idea non polarized "capacitor" or "fuel cell" state (reference 1). As the magnitude of ±CV current difference increased at the same scan voltage range from 0 to −800 mV, so as the open circuit potential result increased. The inset graph illustrates the GC/SAM-DMFC cell of the present invention has an open circuit potential greater than 10-fold than the control without adding o-NPA, and it is also higher than the AU/SAM under a no polarization condition. The spontaneous E-R interaction with o-NPA created a magnitude voltage discharge higher than that of the conventional DMFC cell (1V).

Another example offered a confirmation for this discovered phenomena as shown in FIG. 5A. It illustrates the effect of o-NPA concentrations on the open circuit potential of the GC/SAM at room temperature. The concentration of o-NPA changed from 0.4 mM to 3.2 mM, and the signal was inversely proportional to the "reactant" o-NPA concentrations, that move the OCP toward more negative potential field by 3.5-fold, which indicates the existence of a relationship between the E-R effect, and the fuel cell performance in terms of OCP. The inventor's discovery of the source of energy comes directly from an E-R effect that induced or created the larger OCP difference under a gradient "reactant" concentration, and is revolutionary in the energy field. FIG. 5B further illustrates an accelerative exponential decay relationship between the normalized open circuit potential and the o-NPA concentrations by a nonlinear curve fitting method.

Y (normalized open circuit potential)=$A1*exp(-x/t1)+Y0$, $t1^{-1}$ is the first order decay rate constant, x is the variable in o-NPA concentration, A1 is the amplitude, Y0 is the offset.

The 0.61 OCP unit/mM rate constant means a galvanic energy cell can be created by a half-life of τ equals to 0.693/1.638=1.14 unit of OCP/mM o-NPA, and if the o-NPA concentration is 2.4 mM, then the OCP can be 7.29 unit of normalized OCP after added the $Y_0$ offset. The difference is seen between 10V and the projected 7.29V, indicating the existence of the o-NPA concentration gradient effect on the E-R momentum in a quiet condition. Further experiments have confirmed the projection and the expectation were met.

Another example further provides the E-R effect on the fuel cell performance in respect of charging voltage as shown in FIG. 6A. It illustrates the charging voltage increased as inversely proportional to the o-NPA concentrations over the range from 0.4 to 3.2 mM under 10 μA charge rate. FIG. 6B further illustrates an accelerative exponential decay relationship between the normalized charge voltage and the o-NPA concentrations fitted by a first order exponential decay non-linear curve fitting model described above. The 1.38 unit of voltage/mM rate constant also confirmed a galvanic energy cell can be created. Our further experiments have confirmed the projection and the expectation. The trends of the concentration factor that effects on the energy cell performance have agreed well by FIGS. 5 and 6.

Example 9

The following example describes the performance of the fuel cell device of the present invention as an biomimetic amperometric sensor.

Mimicking Fibroblast growth factor receptor 1-inhibitor complex. FIG. 7 illustrates the evidence that the amperometric signals increase as o-NPA concentration increase, except the initial interrupting effect at 0.4 mM, that the current decreases, which was consistent with the nanopore effect in literature. The Michaelis-Menten constant ($k_m$) was obtained by a Lineweaver-Burke plot of reciprocal velocity of the initial rate of the catalytic current, by an amperometric method vs. reciprocal concentration is 0.24 mM for the GC/SAM o-NPA sensor. This is about a 30-fold increase in the inclusion compared with the literature. This also indicates the biomimetic structure of FGF with inhibitors in the fuel cell of the present invention, has accomplished by the small $K_m$, i.e., strong receptors-inhibitor inclusion, hence a strong E-R effect. The insert is the linear least-square regression of the current density data ($I_t/cm^2$) vs. o-NPA concentrations. The amperometric data was obtained under conditions of applied $E_{first\ step}$=−200 mV and $E_{second\ step}$=−600 mV with 1 cm$^2$ GC/SAM electrode, and all other electrodes are same as described in the experimental section. The FIG. 7 shows the amperometric curves under room temperature without stiffing, because a real world situation of quietness is beneficial for the E-R system. The regression produced an equation y ($\mu A/cm^2$)=0.0+7.54 $\mu A/mM \cdot cm^{-2}$ with a Correlation Coefficient (r)=0.9999 and a standard error of estimation $S_{y/x}$=0.065.

Example 10

The following example describes the performance of the fuel cell device of the present invention as a cyclic voltammetric sensor.

Figure 2B:
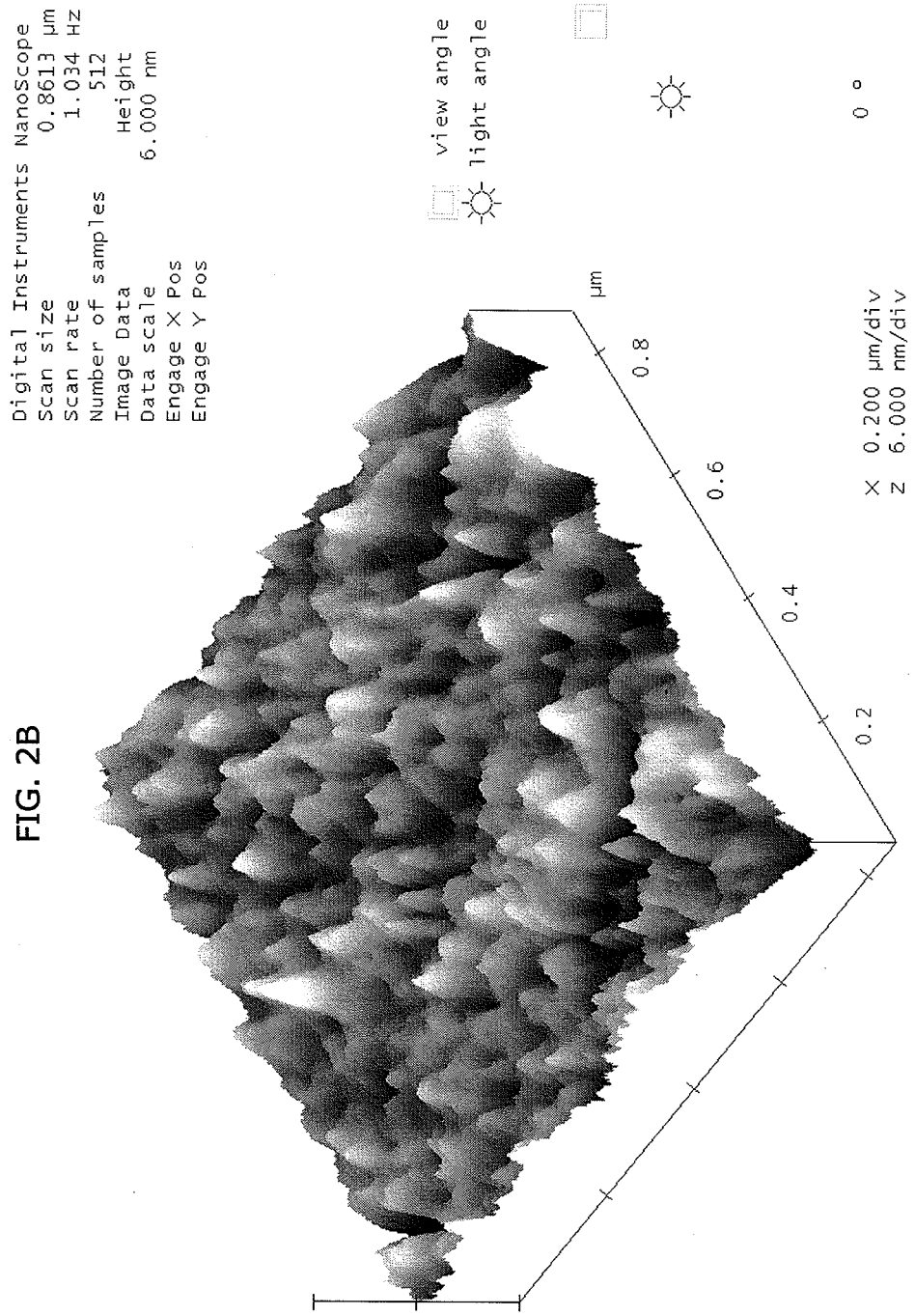

Current Density. FIG. 8 illustrates the o-NPA concentration effects on the current density by comparing a gold/SAM electrode. FIG. 8 and GC/SAM electrode of FIG. 4A under the same membrane fabrication. In FIG. 8, the DET peak located in −0.2V without o-NPA. A positive correlation between the concentration of o-NPA and the current density was observed, and the current density was 17.3, 22.7, and 32.0-fold enhanced against the control DET peak. The DET peak moved by −116 mV indicates an E-R effect exists due to the aromatic ring of the o-NPA interacted with the receptors of the active sites. Comparing FIGS. 8 and 4A, the GC/SAM has magnitudes increased the current density to 0.1 A/cm2. When comparing the large CV curve in FIG. 4, it also reflects that the GC/SAM's current density is increased by two orders of magnitude after adding 2.4 mM o-NPA, compared with the GC control, indicating o-NPA played an important role in fuel cell energy conversion. The explanation for the dramatic difference is the nanostructure of the electrode of the present invention. One can see from FIG. 2A the AU/SAM surface is covered with thick islands, while the GC/SAM is covered with a mix of pillars/pores (FIG. 2B). Hence, the pores offer an advantage of high surface area to volume ratio and lead the GC/SAM-MEA superior over the current DMFC fuel cells. The present result provides a 50-fold increase performance in the current density compared with literature.

Example 11

The following example describes the performance of the fuel cell device of the present invention as a switchable pseudo-semiconductor.

The switchable pseudo-semiconductor. From FIG. 4, one cross observed at the oxidation and reduction cross section at −0.16 V, indicates the pseudo-semiconductor behavior of the BER electrode/membrane-DMFC system, that provides the unusual low switchable window of semiconductor between −0.1 to −0.2V, that is 165-fold decreased the voltage needed for a semiconductor to be switchable functionally. Again, this phenomena was observed in the 7.07 mm$^2$ GC/SAM in 1M methanol with a switch voltage window −0.7V to −0.75V (FIG. 9A) compared with a AU/SAM, with a uniform average 20 nm nanopore membrane structure as shown in FIG. 9B (reported in US 20080237063). FIG. 9C is the section analysis of the AU/SAM reported in US 20080237063. The GC/SAM with fabrication method as described in US 20080237063 for AU/SAM also is true for the GC/SAM. FIGS. 9D. 9E and 9F are the AFMs for GC/SAM. In overall, the current density from GC/SAM is better than that of AU/SAM in two types of fabrication techniques: TCD/PEG/PVP/β-CD co-polymer and m-β-DMCD/PEG/PVP, respectively. The former method is far much better than the reported in US20080237063 in response to convert to cell energy in the response to o-NPA regardless Au or GC were used, indicates GC/TCD fabrication is the optimum cell MEA for either as for a semiconductor or for a fuel cell's utility.

Example 12

This example describes single cell performance as a DMFC cell.

The embedding of a "reactant" (o-NPA) into the polymer matrix membrane increased discharge voltage: It is a good idea to embed the o-NPA into the polymer network and to reduce the distance for electron-relay between the receptors. FIG. 10 Illustrates the AFM image of an embedded "reactant" o-NPA into the SAM polymer block with the membrane thickness of 5.4 μm. FIG. 11 Illustrates the AFM image of an embedded "reactant" o-NPA into the SAM polymer block with the membrane thickness of 48 nm. FIG. 12 illustrates the advantage of higher nominal discharge voltage of 6.7 V for 12 hours at room temperature for a single 0.5 cm$^2$ GC/SAM fuel cell with embedded o-NPA of 48 nm membrane thickness, compared with that of 3.9V without embedding, but only has 2.4 mM o-NPA in the 1M methanol media (B). The 0.5 cm$^2$ GC/SAM nominal discharge voltage is 58% of the embedded o-NPA DMFC. Both curves have the same discharge load of 50 mA with the current density of 100 mA/cm$^2$.

Temperature effects on the cell discharge. FIG. 13 illustrates the nominal discharge voltage with the highest voltage 6.7 V at 20° C. for a straight steady-state, 12 hours discharge, that is >55° C.>−20° C. The temperature effect on the discharge voltage rate is 8.5 mV/° C. over the studied temperature range from −20° C. to 55° C. The drifting occurred at −20° C., due to cold temperature, has certain degree affected on the discharge.

Membrane Thickness Effect. FIG. 14 illustrates the membrane thickness change affected on the discharge under the same experimental conditions. The 48 nm thickness GC/SAM cell has a higher discharge voltage than that of the GC/SAM membrane with 5.4 µm thickness, i.e. 6.7 V vs. 5.3 V. Both are embedded with o-NPA. However, both configurations of the fuel cells made a steady-state 12 hours discharge with the satisfactory performance characteristics.

High Power and Energy Density of the Dual Functions of Battery/fuel cell. Table I summarized the performance of the embedded reactant GC/SAM performance with high power and energy density as shown in Table 1:

TABLE 1

Performance Comparison

| | Energy Density (kWh/kg) | Power Density (kW/kg) | Energy Efficiency (%) |
|---|---|---|---|
| Thin membrane | 24.3 | 2.4 | 94.8% |
| Thick membrane | 18.0 | 1.6 | 96.5% |

Energy Density (ED). Determination of the energy density of a DMFC cell is formulated as the capacity in ampere-hours that the cell delivers under the temperature and the load condition multiply by the average discharge voltage, and divides by the cell volume or weight. The equations for gravimetric and volumetric energy densities are shown below.

$$ED = \frac{\text{Capacity (Amperes} \times \text{Hours)} \times \text{Average Discharge Voltage}}{\text{Weight of cell (Pounds, or Kilograms)}} = \frac{\text{Watt} - \text{hours}}{\text{(lb) or (kg)}}$$

The ED of the DMFC of the present invention was 24.3, and 18.0 kWh/kg, for the thinner membrane, and the thicker GC/SAM membrane, respectively.

Power Density (PD). Determination of the power density of a DMFC cell is formulated as the nominal voltage multiply by the discharge current, the product is in Watt and then divides by the cell volume or weight. The equations for gravimetric energy density is shown below.

$$PD = \frac{\text{Discharge current} \times \text{nominal Discharge Voltage}}{\text{Weight of cell (Pounds, or Kilograms)}} = \text{Watt} / \text{(lb) or (kg)}$$

Energy Efficiency. FIG. 15 illustrates the discharge and charge efficiency with a membrane thickness of 5.4 µm at 20° C. The efficiency reached 96.5%. It clearly indicates that this fuel cell is a reversible system with minimum energy loss. Table 1 also compares with the both configured embedded reactant o-NPA GC/SAM cells that have satisfactory energy efficiency results with 94.8 and 96.5% for 48 nm and 5.4 µm membranes, respectively.

Open Circuit Potential (OCP). FIG. 4 insert illustrates the GC/SAM-DMFC cell has an open circuit potential greater than 10-fold than the control without adding o-NPA and it is also higher than the AU/SAM under no polarization condition. The spontaneous E-R interaction with o-NPA created a magnitude OCP voltage higher than that of the conventional DMFC cell (1V). Our new approach saves resources because there is no need for oxygen (thus excellent for submarines and Unmanned Underwater Vehicles, UUVs) and no need for refueling the methanol (thus excellent for Unmanned Air Vehicles, UAVs). In addition, there is no danger from a dry membrane, no fire hazard, and no toxicity. The fuel cell works at room temperature, which is highly desirable; a portable fuel cell can then readily substitute for a conventional battery. The fuel cell will be less expensive because there is no need to use expensive platinum powder as catalyst.

Example 13

The following example describes the performance of the fuel cell device of the present invention as a rechargeable battery.

Rechargeable. Recharging a conventional DMFC cell is impossible because the conventional DMFC cell produces $CO_2$ and water through redox reaction. The irreversibility of the cell greatly limits its utility. The fuel cell device of the present invention can be recharged and used as a battery because there are no by-products produced. There is no $CO_2$, and no extra water produced. FIG. 16 illustrates the utility of the DMFC cell as a battery. The 0.5 $cm^2$ DMFC cell was charged by a 50 mA constant DC current load, and a steady-state (s-s) potential reached to 3.9 V after 60 minutes, which was then stable for hours. FIG. 16 illustrates a recharged curve at 40 mA DC current load for charge 5 hours at steady-state for 3.6V. From a theoretical projection of a reversible cell voltage without loss or by-product are produced, all the changes in the Gibbs free energy of the formation of the reversible cell would be converted into electric energy, so:

$$E_r = -\Delta G_f,$$

where F is the Faraday constant, $\Delta G_f$ is the change of Gibbs free energy of formation of the reversible cell reactions at the room temperature of 25° C., and p=1.0 atm, so −698.2 KJ/mol would be the Gibbs free energy change, hence a reversible cell voltage is $E°_r$=1.21 V. From the result obtained FIG. 16, indicates the reversibility of the DMFC cell is accomplished without loss, and demonstrated there is no by-products were produced. A steady-state (s-s) voltage recharged to 3.9 V indicates the cell is more energy efficient (~95%), which is not a conventional DMFC device with the energy efficiency between 15-70%. It is a new dual function "battery/fuel cell" device.

Example 14

The following example describes the precision experiments performed on the fuel cell device of the present invention.

Precision. Between-run precision assessments were conducted by using the newly developed fuel cells with the 5.4 µm thickness membrane at 20° C. for measuring the 12 hours steady state discharge at three different days under same experimental conditions. The results have excellent agreement with a mean of 5.3V and a standard deviation of ±0.18V. The coefficient of variation (CV) is 3.4%.

Example 15

The following describes a method for fabricating the embedded "reactant" o-NPA into the polymer matrix network blocks to form a SAM on a 1 $cm^2$ GC electrode.

The thicker 5.4 μm membrane was shown in FIG. 10, fabricated by dividing a mixture solution of TCD-PEG/PVP/CD-co-polymer 200 μl into 10 small portions, and depositing consecutively with a drying time of 15 minutes at 35° C., between each deposit on a 1 cm$^2$ GC substrate. After that, the normal procedures were followed. The thinner membrane was shown in FIG. 11, fabricated by depositing the 120 μl mixture solution onto the 1 cm$^2$ GC surface at once. All other incubating time and temperature and procedures were same as described above. Before the o-NPA was added into the mixture, there was a incubating time 0.5-2 hrs to warm up the mixture, then a molar ratio of 1:1000 of NPA: TCD was adjusted and added the NPA into the mixture and then follow the normal procedures for incubating.

Solutions of stabilizing reagent were formulated as 0.2 mg/ml T-CD in 1M methanol for all Figures except in FIGS. 5 to 9A, which were in 1M methanol only. FIG. 4 was performed with the stabilizing reagents of the same concentration of T-CD as mentioned above plus a 0.5 g/dl glucose was included in the 1M methanol at the early experiment. Later it was found that the glucose had no effect on the cell performance and no effect on the cell stabilization, so it was excluded.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fuel cell device comprising:
   (a) an electrode comprising a substrate of gold or glassy carbon;
   (b) a self-assembling membrane comprising a polymer matrix;
      wherein the polymer matrix is comprised of an electrically conductive copolymer;
      wherein the copolymer is further comprised of:
         one or more first [beta]-cyclodextrin molecules having at least one or more free acetyl groups;
         one or more polyethylene glycol molecules;
         one or more poly(4-vinylpyridine) molecules; and
         one or more second [beta]-cyclodextrin molecules;
   (c) the self-assembling membrane having a nanobiomimetic surface structure comprising one or more nanopillars and one or more nanopores;
   (d) an insulator;
   (e) at least two current collectors.

2. The fuel cell device of claim 1, wherein the first [beta]-cyclodextrin molecule is triacetyl-P-cyclodextrin.

3. The fuel cell device of claim 1, wherein the polymer matrix comprises a copolymer of triacetyl-P-cyclodextrin, polyethylene glycol, poly(4-vinylpyridine), and [beta]-cyclodextrin in a percent ratio (v/v) of 20-35:10-20:25-30:15-45 respectively.

4. The fuel cell device of claim 1, wherein the self-assembling membrane has nanopillars having a diameter in the range of between about 10 nm to about 40 nm, and an average length between about 2 nm to about 4 nm.

5. The fuel cell device of claim 1, wherein the self-assembling membrane has nanopores having a diameter in the range of between about 50 nm to about 60 nm.

6. The fuel cell device of claim 1, wherein the insulator is an aqueous solution of methanol.

7. The fuel cell device of claim 1, wherein the current collector is a wire made from a metal selected from the group consisting of Au, Ag, Pt, and Pd.

8. The fuel cell device of claim 1, wherein the polymer matrix has embedded within it a hydrophobic, aromatic acetate.

9. The fuel cell device of claim 8, wherein the hydrophobic, aromatic acetate is o-NPA.

10. A direct fuel cell device comprising:
    (a) an electrode comprising a substrate of gold or glassy carbon;
    (b) a self-assembling membrane comprising a polymer matrix;
       wherein the polymer matrix is comprised of an electrically conductive copolymer;
       wherein the copolymer is further comprised of:
          one or more first [beta]-cyclodextrin molecules having at least one or more free acetyl groups;
          one or more polyethylene glycol molecules;
          one or more poly(4-vinylpyridine) molecules; and
          one or more second [beta]-cyclodextrin molecules;
    (c) the self-assembling membrane having a nanobiomimetic surface structure comprising one or more nanopillars and one or more nanopores;
    (d) an insulator;
    (e) at least two current collectors; and
    (f) wherein the polymer matrix has embedded within it a hydrophobic, aromatic acetate.

11. The fuel cell device of claim 10, wherein the hydrophobic, aromatic acetate is o-NPA.

* * * * *